US007760686B2

(12) United States Patent
Saito et al.

(10) Patent No.: US 7,760,686 B2
(45) Date of Patent: Jul. 20, 2010

(54) WIRELESS PACKET COMMUNICATION METHOD AND WIRELESS PACKET COMMUNICATION APPARATUS

(75) Inventors: Kazuyoshi Saito, Tokyo (JP); Tomoaki Kumagai, Kanagawa (JP); Shinya Otsuki, Kanagawa (JP); Kengo Nagata, Kanagawa (JP); Satoru Aikawa, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 969 days.

(21) Appl. No.: 10/542,219

(22) PCT Filed: Sep. 9, 2004

(86) PCT No.: PCT/JP2004/013481

§ 371 (c)(1),
(2), (4) Date: Jul. 14, 2005

(87) PCT Pub. No.: WO2005/027422

PCT Pub. Date: Mar. 24, 2005

(65) Prior Publication Data

US 2006/0109813 A1 May 25, 2006

(30) Foreign Application Priority Data

Sep. 9, 2003 (JP) .............................. 2003-317099
Oct. 9, 2003 (JP) .............................. 2003-351161

(51) Int. Cl.
*H04W 4/00* (2009.01)
*H04W 40/00* (2009.01)
*H04W 72/00* (2009.01)
*H04L 12/413* (2006.01)
*G01R 31/08* (2006.01)
*H04J 1/16* (2006.01)

(52) U.S. Cl. ....................... 370/329; 370/445; 370/231; 370/235; 455/445; 455/450

(58) Field of Classification Search .................. 370/329, 370/337, 338, 348, 236, 412, 445, 447, 462, 370/231, 235; 455/445, 450

See application file for complete search history.

(56) References Cited

U.S. PATENT DOCUMENTS

2003/0040342 A1* 2/2003 Coan et al. .................. 455/571
2003/0133469 A1* 7/2003 Brockmann et al. ......... 370/445
2003/0210710 A1* 11/2003 Odman ....................... 370/471

FOREIGN PATENT DOCUMENTS

JP 05-035624 A 2/1993
JP 2001-203710 A 7/2001
JP 2003-110575 A 4/2003

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner*—George Eng
*Assistant Examiner*—Wesley L Kim
(74) *Attorney, Agent, or Firm*—Harness, Dickey & Pierce, P.L.C.

(57) ABSTRACT

A plurality of types of available transmission rates to be used for transmission of data packets are individually managed for each receiver terminal. When there are a plurality of data packets to be transmitted onto a transmission buffer and when it is possible to transmit said plurality of data packets simultaneously, the packet sizes representative of the data amounts of the respective data packets are referred to as well as the transmission rates of the respective data packets associated with the receiver terminals. The packet time lengths (transmission times) defined by the packet sizes and transmission rates are checked for the respective data packets. A plurality of data packets whose packet time lengths are approximately equal to each other are selected regardless of their receiver terminals. The transmissions of the plurality of selected data packets are commenced simultaneously by use of a plurality of radio channels.

24 Claims, 18 Drawing Sheets

OTHER PUBLICATIONS

IEEE Std 802.11-1997, Information technology—Telecommunications and information exchange between systems—Local and metropolitan area networks—specific requirements—Part 11: Wireless LAN Medium Access Control (MAC) and Physical Layer (PHY) specifications.

Low-powered Data Communication System/Broadband Mobile Access Communication System (CSMA) standard, ARIB STD-T71 version 1.0, Association of Radio Industries and Businesses (with English Translation).

Kurosaki et al., "1000Mbit/s SDM-COFDM over MIMO Channel for Broadband Mobile Communications", Technical Report of the Institute of Electronics, Information and Communication Engineers, A P2001-96, RCS2001-135.

Iizuka et al., "5 GHz Wireless LAN System Based on the IEEE 802.11a standard—Packet Transmission Characteristics—", B-5-124, Proceedings of the Electronics Information and Communication Engineers, Society Conference 2000 (with English Translation).

\* cited by examiner

FIG. 2

(1) DATA PACKET

| Packet-type inform. | Receiver ID | Transmitter ID | Sequence number | ACK packet transmission time | Duration | | Data frame | FCS |
|---|---|---|---|---|---|---|---|---|

← MAC HEAD →

(2) ACK PACKET

| Packet-type inform. | Transmitter ID of data packet received latest | Duration | | FCS |
|---|---|---|---|---|

← MAC HEAD →

FIG. 7
(1) MODE 1
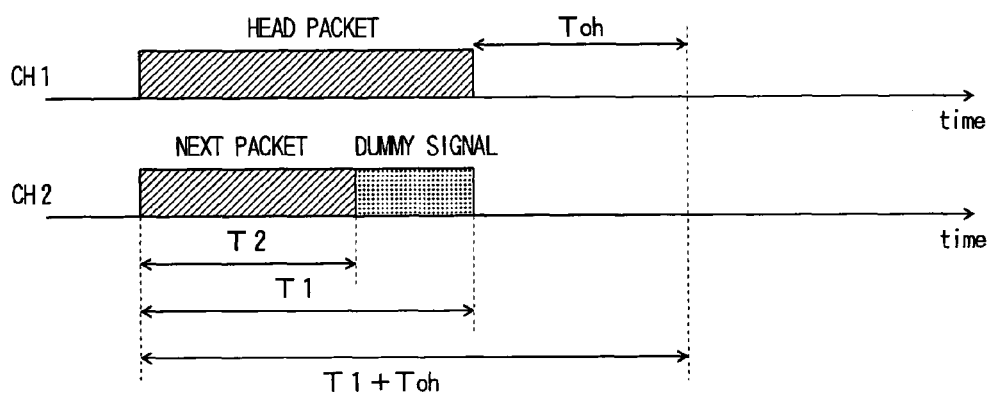
(2) MODE 2
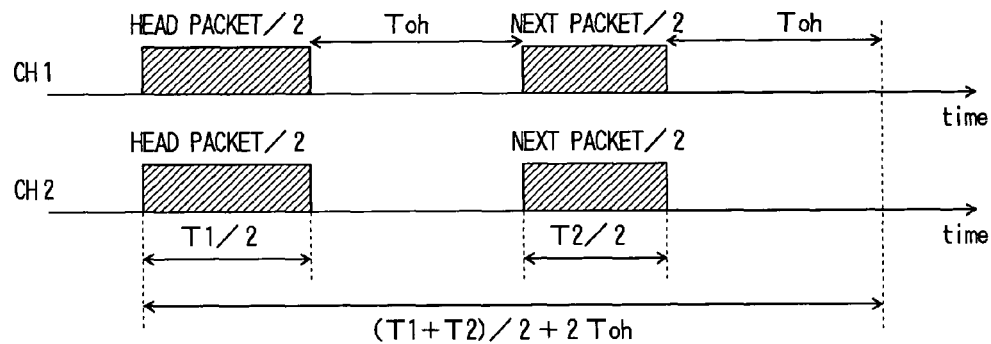

WIRELESS PACKET COMMUNICATION METHOD AND WIRELESS PACKET COMMUNICATION APPARATUS

CROSS-REFERENCE TO RELATED APPLICATION

This application is based upon and claims the benefit of priority from Japanese Patent Application Nos. 2003-317099, filed on Sep. 9, 2003, and No. 2003-351161, filed on Oct. 9, 2003, the entire contents of which are incorporated herein by reference.

TECHNICAL FIELD

The present invention relates to a wireless packet communication method of simultaneously transmitting data packets addressed to different destinations, using a plurality of radio channels and Multiple Input Multiple Output (hereinafter MIMO) among a plurality of stations (hereinafter STAs) and a wireless packet communication apparatus.

BACKGROUND ART

In a conventional wireless packet communication apparatus, only one radio channel to be used is determined in advance and it is detected whether the radio channel is idle or not (carrier sense) prior to transmitting data packets. Only when the radio channel is idle, only one data packet is transmitted. By such a control, one radio channel can be used together at different times by a plurality of STAs ((1), International Standard ISO/IEC 8802-11 ANSI/EEE Std. 802.11, 1999 edition, Information technology—Telecommunications and information exchange between Systems—local and metropolitan area networks—Specific requirements—part 11: Wireless LAN Medium Access Control (MAC) and Physical Layer (PHY) specifications; (2) "Low-powered Data Communication System/Broadband Mobile Access Communication System (CSMA) Standard, ARIB STD-T71 version 1.0, Association of Radio Industries and Businesses, settled in 2000).

In such a wireless packet communication apparatus, in order to improve the maximum throughput, for example, there provided a method in which the frequency band per one radio channel is expanded to speed up the transmission rate in the PHY layer.

However, as pointed out even in a document (Iizuka et al., "5 GHz Wireless LAN System Based on the IEEE802.11a standard—Packet Transmission Characteristics—", B-5-124, Proceedings of the Electronics Information and Communication Engineers, Society Conference 2000, September 2000), for collision of packets avoidance, a constant transmission deferral duration, which does not rely on the transmission rate in the PHY layer immediately after packet is transmitted, needs to be provided. With the transmission deferral duration provided, as the transmission rate in the PHY layer increases, the transmission efficiency (the ratio of the transmission rate in the PHY layer to the maximum throughput) of data packets decreases. Therefore, although the transmission rate in the PHY layer increases, throughput is not improved significantly.

Correspondingly, as a method of improving the maximum throughput without expanding frequency band per one radio channel, application of a MIMO technique (Kurosaki et al., "100 Mbit/s SDM-COFDM over MIMO Channel for Broadband Mobile Communications", Technical Reports of the Institute of Electronics, Information and Communication Engineers, A•P 2001-96, RCS2001-135(2001-10)) is considered. The MIMO technique is a method in which different data packets are transmitted simultaneously from a plurality of antennas through the same radio channel and the plurality of data packets transmitted simultaneously are received through the same radio channel by digital signal processing corresponding to the difference in propagation coefficients of the respective data packets received in a plurality of antennas of the opposite STA. Further, according to propagation coefficient or the like, a MIMO number is determined.

Meanwhile, when the respective ones of STAs have a plurality of Wireless Network Interfaces and a plurality of radio channels are available, different radio channels are used respectively among a plurality of STAs, which can improve throughput compared to the case where one radio channel is time-divided to communicate. For example, by using a radio channel CH1 between the STAs A and B and by using a radio channel CH2 between the STAs A and C, respective data packets can be transmitted and received simultaneously between the STA A and the STAs B and C, as shown in FIG. 17. Alternately, by using the radio channels CH1 and CH2 between the STA A and the STA B, two data packets can be transmitted and received simultaneously, as shown in FIG. 18.

However, in the case where center frequencies of a plurality of radio channels to be used simultaneously come close to each other, an effect of leakage power leaking into the frequency band which is used between one radio channel and the other radio channel becomes great. In general, when data packets are transmitted, a transmit-side station first transmits data packets and then, a receive-side station returns an acknowledgment packet (ACK packet or NACK packet) for the received data packet to the transmit-side station. When the transmit-side station tries to receive the acknowledgement packet, an effect of leakage power from other radio channels where the packets are transmitted simultaneously becomes a problem.

For example, as shown in FIG. 19, it is assumed that the center frequencies of the radio channel CH1 and the radio channel CH2 come close to each other and transmission times for packets to be simultaneously transmitted from the respective radio channels are different. Here, the data packet transmitted from the radio channel CH1 is short. Therefore, when an ACK packet for the data packet is received, the radio channel CH2 is in transmission. For this reason, in the radio channel CH1, it is likely that an ACK packet cannot be received due to leakage power from the radio channel CH2. Under such a condition, even though transmissions are performed simultaneously by use of a plurality of radio channels, throughput can not be expected to be improved.

Further, when the transmission rates in the respective radio channels are equal to each other, such a case occurs due to the difference in the data sizes of the respective data packets. In addition, when the transmission rates of the respective radio channels are not equal to each other, such a case occurs due to the difference in (the data sizes/the transmission rates) of the respective data packets. That is, such a case occurs due to the difference in the packet time lengths which are transmission times for the respective data packets.

However, in a wireless LAN system or the like, the data sizes of data frames to be input from a network are not constant. Accordingly, when data frames to be input are sequentially converted into data packets to be transmitted, the packet time lengths (transmission times) of the respective data packets also change. For this reason, although a plurality of data packets are transmitted simultaneously as shown in FIG. 19, the difference in the packet time lengths of the respective data packets occurs, so that it is very likely to fail to receive an ACK packet.

Subsequently, the respective data frames on a buffer are divided at even intervals into a plurality of data blocks, so that data packets are generated from the respective data blocks. Accordingly, a plurality of data packets having the same sizes are acquired. Therefore, if these packets are transmitted simultaneously through a plurality of radio channels, an effect of leakage power can be avoided. However, in this case, since the respective data frames input into a buffer are divided into a plurality of data blocks, the sizes of the respective data packets becomes smaller than usual, so that effective throughput decreases.

In addition, for example, with a predetermined number of data frames provided on a buffer, a plurality of data frames having the same sizes are extracted among those data frames. If the extracted data frames are converted into data packets and controlled so as to be transmitted simultaneously, an effect of leakage power can be avoided. However, in this case, since transmissions have to be delayed until a plurality of data frames having the same sizes are provided on a buffer, the transmissions can not be effectively commenced and reduction in effective throughput can not be avoided. In addition, when data frames having the same sizes do not appear for a long time, a transmission delay is increased.

In addition, when transmissions of data packets are performed between a plurality of receivers through wireless links as shown in FIG. 17, it is assumed that the transmissions of the data packets are performed at transmission rates which are different for the respective receivers. In this case, if data packets which are configured by data frames having the same sizes but have different receiver addresses are transmitted simultaneously, the transmissions are not completed simultaneously and the receptions of acknowledge packets fail due to leakage power. Accordingly, there is a case where data packets whose receiver addresses are different can not be transmitted simultaneously even though they have the same sizes. For this reason, it is very likely that the wait time until a plurality of data packets having the same receiver addresses and the same sizes appear becomes long.

Correspondingly, if the respective STAs to be receivers grasp available transmission rates in advance, packet time lengths (transmission times), which are determined by the data sizes of data packets and the transmission rates to be used, can be grasped. Therefore, a plurality of data packets having the same packet time lengths can be selected simultaneously. When transmissions of a plurality of data packets having the same packet time lengths are commenced simultaneously, the transmissions of them are completed simultaneously. Therefore, acknowledge packets for the respective data packets can be received approximately at the same time and an effect of leakage power can be avoided.

However, in the conventional wireless LAN system defined by IEEE 802.11a, as a transmission rate to be used for transmission of an acknowledge packet, the maximum mandatory rate (any one of 6, 12, and 24 [Mbit/s]) which does not exceed the transmission rate of the received data packet addressed to the own station is selected. For this reason, through radio channels CH1 and CH2 where transmission rates are different with respect to two STAs as shown in FIG. 20, data packets (1) and (2) having the same packet time lengths are transmitted simultaneously and acknowledge packets ACK (1) and ACK (2) corresponding to the respective data packets are received simultaneously. Nevertheless, since transmission times for the respective ACK packets are different, a difference occurs in a time when the receptions of the respective ACK packets are completed. At this moment, right in the middle of reception of ACK (2) through the radio channel CH2, if data packets are transmitted from the radio channel CH1 where the ACK reception is completed previously, it is likely that the reception of ACK (2) through the radio channel CH2 fails.

In other words, there is a case where data packets whose receiver addresses are different cannot be transmitted simultaneously even though the packet time lengths are the same according to the respective transmission rates. For this reason, it is very likely that the wait time until a plurality of data packets having the same receiver addresses and the same sizes appear becomes long.

In addition, as shown in FIG. 21, data packets having different receiver addresses from one transmit-side station are superposed into one radio channel by the MIMO to be transmitted at the same time, the data packets are separated by the respective receiver terminals, and the data packets addressed to the own station can be received. At this time, although the respective receive-side station simultaneously transmits acknowledge packets for the data packets addressed to the own station through the same radio channel, the transmit-side station cannot receive a plurality of acknowledge packets returned simultaneously through the same radio channel.

An object of the present invention is to provide the wireless packet communication method and wireless packet communication apparatus which can reduce probability of reception failure of acknowledgment packets and improve effective throughput by use of a plurality of radio channels and by the MIMO, even though an effect of leakage power appears between STAs when data packets having different receiver addresses are transmitted simultaneously.

DISCLOSURE OF THE INVENTION

The first and tenth aspects of the invention are a wireless packet communication method and wireless packet communication apparatus, respectively, in which data packets are transmitted by use of radio channels which are determined to be idle by carrier sense, between more than three STAs in which a plurality of radio channels are available.

A plurality of types of available transmission rates to be used for transmissions of data packets are individually managed for each receiver terminal. When there are a plurality of data packets to be transmitted onto a transmission buffer and when it is possible to transmit a plurality of data packets simultaneously, the packet sizes representative of the data amounts of the respective data packets are referred to as well as the transmission rates of the respective data packets associated with the receiver terminals. The packet time lengths (transmission times) defined by the packet sizes and transmission rates are checked for the respective data packets. A plurality of data packets whose packet time lengths are approximately equal to each other are selected regardless of their receiver terminals. The transmissions of the plurality of selected data packets are commenced simultaneously by use of a plurality of radio channels.

Accordingly, the transmission rates are individually managed for each receiver terminal, the packet time lengths defined by the packet sizes and transmission rates are checked for the respective data packets, and the transmissions of the plurality of data packets whose packet time lengths are approximately equal to each other are commenced simultaneously. Therefore, before start of receptions of acknowledgment packets, the transmissions of all the data packets can be completed. Accordingly, even when power leakages occur between the radio channels, acknowledgment packets can be received without receiving any effect of the power leakage. Further, since a plurality of data packets to different destinations can be transmitted simultaneously, the transmission wait time until a plurality of data packets to be transmitted are provided on a transmission buffer can be shortened and effective throughput is improved.

The second and eleventh aspects of the invention are a wireless packet communication method and wireless packet communication apparatus, respectively, in which, between more than three STAs which can perform the MIMO on a plurality of signals for one radio channel, data packets are transmitted by the MIMO by use of radio channels which are determined to be idle by carrier sense.

A plurality of types of available transmission rates to be used for transmission of data packet are managed individually for each receiver terminal. When there are a plurality of data packets to be transmitted onto a transmission buffer and when it is possible to transmit the plurality of data packets simultaneously, the packet sizes representative of the data amounts of the respective data packets are referred to as well as the transmission rates of the respective data packets associated with receiver terminals. The packet time lengths (transmission times) defined by the packet sizes and transmission rates are checked for the respective data packets. A plurality of data packets whose packet time lengths are approximately equal to each other are selected regardless of their receiver terminals. The time when the receiver terminals of the data packets transmit acknowledgment packets are determined from the packet time lengths of the data packets and of acknowledgment packets to be calculated from the transmission rates of the data packets associated with destinations. Information on acknowledgment packet transmission times and information on transmission deferral duration (NAV) are stored in the respective data packets. The acknowledgement packet transmission times are the times when the receiver terminals of the respective data packets are allowed to transmit acknowledgment packets, and the transmission deferral duration is a period of time taken for completion of the transmissions of the acknowledgment packets to all the data packets transmitted simultaneously. The transmissions of the plurality of selected data packets are commenced simultaneously by the MIMO.

Since information indicating transmission times of acknowledgment packets are included in the respective data packets which the transmit-side station transmits, it is possible to individually control the time when a plurality of receive-side stations as destinations of the respective data packets transmit acknowledgment packets. That is, since a plurality of receive-side stations can transmit acknowledgment packets at different times, the transmit-side station which has transmitted data packets can sequentially receive acknowledgment packets to be returned from a plurality of receive-side stations. Accordingly, since a plurality of data packets to different destinations can be transmitted simultaneously by use of the MIMO, the transmission wait time until a plurality of data packets to be transmitted are provided on a transmission buffer can be shortened and effective throughput is improved.

In a third aspect of the invention according to the first and second aspects of the invention and in a twelfth aspect of the invention according to the tenth or eleventh aspects of the invention when a plurality of data packets whose packet time lengths are approximately equal to each other are selected in association with the transmission rates lower than current transmission rates, the transmission rates to perform transmissions are switched over to the lower transmission rates.

Here, since the packet time lengths are obtained for current transmission rates of the respective data packets associated with destinations as well as for transmission rates lower than those, it is very probable that packet time lengths of a plurality of data packets on a transmission buffer are approximately the same. Accordingly, the wait time until the transmissions of the data packets are commenced can be shortened and effective throughput is improved.

In a fourth aspect of the invention according to the first or second aspect of the invention and in a thirteenth aspect of the invention according to the tenth or eleventh aspect of the invention, when a first mode where into a plurality of data packets whose packet time lengths are equal to each other are generated by dividing a unit of data on a transmission buffer and a second mode where a plurality of data packets whose packet time lengths are substantially equal are generated by adding a dummy signal to at least one of a plurality of data packets whose packet time lengths are different can be selected, transmission efficiency in the first mode and transmission efficiency in the second mode are compared to each other, and a plurality of data packets whose packet time lengths are approximately equal to each other are selected according to the comparison result.

When there are a plurality of data packets whose packet time lengths are not equal, it is possible to generate a plurality of data packets whose packet time lengths are equal by dividing each data packet into more than two packets at even intervals and to transmit the plurality of date packets simultaneously (the first mode). In addition, dummy signals are added to data whose packet time lengths are short so that the packet time lengths correspond to packet time lengths of other data packets. Then, the data packets can be transmitted simultaneously (the second mode). The efficiency in the first mode and the efficiency change according to a condition (combination of data sizes or the like). Here, since the first mode and the second mode can be adaptively selected in consideration of transmission efficiency, transmission efficiency and effective throughput can be improved.

In a fifth aspect of the invention according to the first aspect of the invention and in a fourteenth aspect of the invention according to the tenth aspect of the invention, an STA which receives a plurality of data packets including data packets addressed to the own station generates acknowledgment packets for the data packets addressed to the own station and compares the receive rates of all the data packets received simultaneously to each other. The STA detects as the lowest receive rate the maximum mandatory rate not exceeding the minimum value of all the receive rates of the data packets, and transmits the acknowledgment packets at the lowest receive rate.

Since the STA receiving data packets transmits acknowledgment packets for data packets addressed to the own station at the transmission rate same as the lowest receive rate, all the transmission rates of the acknowledgment packets for the plurality of data packets transmitted simultaneously are unified into the lowest receive rate and all the transmissions of the acknowledgment packets are completed at the same time. Accordingly, since a plurality of data packets whose destinations are different can be transmitted simultaneously, the transmission wait time until a plurality of data packets to be transmitted on a transmission buffer are provided can be shortened and effective throughput is improved.

In a sixth aspect of the invention according to the first aspect of the invention and in a fifteenth aspect of the invention according to the tenth aspect of the invention, an STA which receives a plurality of data packets including data packets addressed to the own station generates acknowledgment packets for the data packets addressed to the own station and compares the receive rates of all the data packets received simultaneously to each other. When all the receive rates of the data packets are not the same, the STA detects as a lowest receive rate the maximum mandatory rate not exceeding a minimum value of all the receive rates, and detects as a local receive rate the maximum mandatory rate not exceeding the receive rates of the data packets addressed to the own station. When the local receive rate is higher than the lowest receive rate, the STAs adds, to the acknowledgment packets, a dummy bit corresponding to a difference between a first packet time length of an acknowledgment packet to be calculated from the lowest receive rate and a second packet time length of an acknowledgment packet to be calculated from the local receive rate, to transmit them at the local receive rate. When the local receive rate and the lowest receive rate are equal to each other, the acknowledgment packets are transmitted at the lowest receive rate.

When the lowest receive rate and the local receive rate (the receive rate of the data packet addressed to the own station) are not equal, the STA receiving data packets transmits, to the data packets addressed to the own station, at the local receive rate, the acknowledgment packets having added thereto a dummy bit corresponding to the difference between the first packet time length (time required for transmission) of the acknowledgment packet to be calculated from the lowest receive rate and the second packet time length (time required for transmission) of the acknowledgment packet to be calculated from the local receive rate. Accordingly, even when transmission rates of a plurality of acknowledgment packets for the plurality of data packets transmitted simultaneously are not equal to each other, all the packet time lengths of the acknowledgment packets including dummy bits are unified into the same length, so that all the transmissions of the acknowledgment packets are completed simultaneously. That is, since a plurality of data packets to different destinations can be transmitted simultaneously, the transmission wait time until a plurality of data packets to be transmitted on a transmission buffer are provided can be shortened and effective throughput is improved.

In a seventh aspect of the invention according to the first aspect of the invention and in a sixteenth aspect of the invention according to the tenth aspect of the invention, the STA which receives a plurality of data packets including data packets addressed to the own station generates acknowledgment packets for the data packets addressed to the own station and compares the receive rates of all the data packets received simultaneously to each other. When all the receive rates of the data packets are not the same, the STA detects as a lowest receive rate the maximum mandatory rate not exceeding a minimum value of all the receive rates, and detects as the local receive rate the maximum mandatory rate not exceeding the receive rate of the data packet addressed to the own station. When the local receive rate is higher than the lowest receive rate, the STA sets a transmission deferral duration (NAV) in the acknowledgement packets according to the packet time length of an acknowledgment packet to be calculated from the lowest receive rate and transmits them at the local receive rate. When the local receive rate and the lowest receive rate are equal to each other, the STA transmits the acknowledgment packets at the lowest receive rate.

When the lowest receive rate and the local receive rate (the receive rate of the data packet addressed to the own station) are not equal, the STA receiving data packets transmits, to the data packets addressed to the own station, at the local receive rate, the acknowledgment packets including the values related to the first packet time length (time required for transmission) of acknowledgment packet to be calculated from the lowest receive rate as information on the transmission deferral duration (NAV). Accordingly, the transmit-side station prohibits transmissions until the transmission deferral duration included in the received acknowledgment packet passes, even after completing receipt of the acknowledgment packet. Therefore, it is possible to prevent other STAs from commencing the transmissions of data packets before all the transmissions of the acknowledgment packets are completed. That is, since a plurality of data packets to different destinations can be transmitted simultaneously, the transmission wait time until a plurality of data packets to be transmitted on a transmission buffer are provided can be shortened and effective throughput is improved.

In an eight aspect of the invention according to the second aspect of the invention and in a seventeenth aspect of the invention according to the eleventh aspect of the invention, the STA which receives the plurality of data packets including data packets addressed to the own station generates acknowledgment packets for the data packets addressed to the own station and detects acknowledgment-packet transmission times which are held in the data packets addressed to the own station. At the timing of acknowledgment-packet transmission time, the STA transmits the acknowledgment packets at the maximum mandatory rate that does not exceed the receive rates of the data packets addressed to the own station.

Accordingly, since each data packet transmitted by the transmit-side station includes information indicating the transmission times of the acknowledgment packets, it is possible to individually control the times when the plurality of receive-side stations as the destinations of the respective data packets transmit the acknowledgment packets. That is, since the plurality of receive-side stations can transmit the acknowledgment packets at different times with each other, the transmit-side station which has transmitted the data packets can sequentially receive the acknowledgment packets to be returned from the plurality of the receive-side stations. Accordingly, a plurality of data packets to different destinations can be simultaneously transmitted by use of the MIMO, so that the transmission wait time until a plurality of data packets to be transmitted on a transmission buffer are provided can be shortened and effective throughput is improved.

In a ninth aspect of the invention according to the second aspect of the invention and in an eighteenth aspect of the invention according to the eleventh aspect of the invention, the number (Nch) of idle radio channels and the number (Np) of data packets whose packet time lengths are approximately equal to each other are detected, and Np data packets are transmitted at the same time by use of Np radio channels without using the MIMO when Nch is more than Np (Nch≧Np), and a plurality of data packets are transmitted at the same time by use of the MIMO when Nch is less than Np (Nch<Np).

Here, Nch and Np are detected to determine use of a plurality of radio channel and of the MIMO according to conditions, thereby realizing preferable communication. That is, when a plurality of data packets are transmitted simultaneously by use of a plurality of radio channels, a plurality of idle radio channels are effectively used so as to provide high-quality communication and improve effective throughput. In addition, with the use of the MIMO, effective throughput can be improved even when there is only one idle radio channel.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 2 is a diagram showing a configuration of a data packet and an ACK packet.

FIG. 7 is a time chart explaining two kinds of modes in the transmission processing procedure (2).

FIG. 12 is a flow chart showing a reception processing procedure (3) in the wireless packet communication method of the invention.

BEST MODE FOR CARRYING OUT THE INVENTION

[Configuration Example of Wireless Packet Communication Apparatus]

Figure 1:
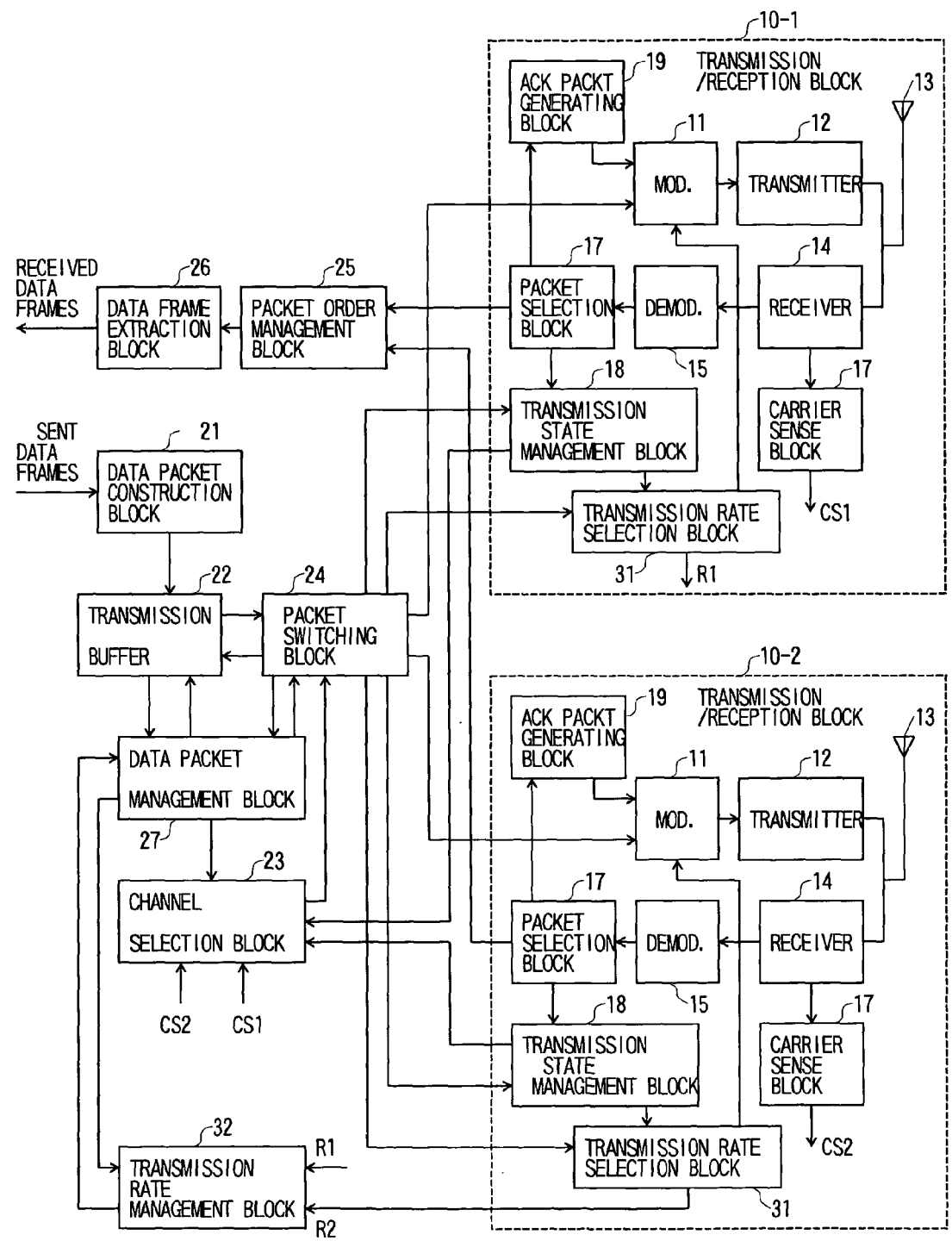
FIG. 1 is a diagram showing a configuration example of a wireless packet communication apparatus according to the present invention.

FIG. 1 shows a configuration example of a wireless packet communication apparatus of the present invention. Here, it is assumed that data packets are transmitted through wireless links between more than three STAs. As these STAs, for example, radio base stations and radio terminals can be assumed, which constitute a wireless LAN system in conformity with IEEE802.11 standards.

In the drawing, the radio base station of the present configuration example includes a plurality of transmit/receive processing blocks 10-1, 10-2, . . . , a data packet construction block 21, a transmission buffer 22, a channel selection block 23, a packet switching block 24, a packet order management block 25, a data frame extraction block 26, a data packet management block 27, and a transmission rate management block 32. Each of the transmit/receive processing blocks 10-1, 10-2, . . . performs radio communication through radio channels which are different from each other. Since the respective radio channels have radio frequencies different from each other, wireless links which the transmit/receive processing blocks 10-1, 10-2, . . . use are separated from each other.

Each of the transmit/receive processing blocks 10 includes a modulator 11, a transmitter 12, an antenna 13, a receiver 14, a demodulator 15, a frame selection block 16, a carrier sense block 17, a transmission state management block 18, an ACK packet generating block 19, and a transmission rate selection block 31. Although only two transmit/receive processing blocks 10 are shown in FIG. 1, the number of the transmit/receive processing blocks 10 to be provided in one STA, if necessary, may increase.

In the STA of the present configuration example, known MIMO communication technique can be applied, but it is omitted here. With the MIMO technique used together, radio packets corresponding to the sum of MIMO numbers for the respective ones of radio channels can be transmitted at the same time.

To begin with, a sent data frames to be transmitted is input into the data packet construction block 21. The sent data frames is configured by one data frame or a plurality of data frames. As a data frame to be actually treated, for example, an Ethernet (registered trademark) frame or the like is assumed. The data packet construction block 21 generates such a data packet that is shown in FIG. 2. That is, the data packet construction block 21 adds control information, including packet-type information, identification information of the receiver, identification information of the transmitter, and a sequence number, to the respective data frames of the sent data frames input into the data packet construction block 21.

The packet-type information is information representing that the data packet is a data packet which is used for transmitting and receiving data frames. The identification information of the receiver is used for specifying an STA which becomes a destination of the corresponding data frame. The identification information of the transmitter is used for specifying a transmit-side station of the corresponding data frame. The sequence number is a number representative of the sequence of the data frame which the corresponding STA transmits. The acknowledgment-packet transmission time is used for assigning a time when an acknowledgment packet is transmitted to the data packet.

The data packets generated by the data packet construction block 21 are input as a data packet series into the transmission buffer 22. The transmission buffer 22 buffers one input data packet or the plurality of input data packets to temporarily hold it or them. In addition, the transmission buffer 22 manages address information associated with the packet size and the destination station ID of the data packet. The address information indicates the address where the respective data packets which are being held at the moment are held. The transmission buffer 22 sequentially outputs the information as information on the stored data packets. The information on the stored data packets is input into the data packet management block 27.

The data packet management block 27 refers to the information on the stored data packets which is sequentially input from the transmission buffer 22 and associates with each other the address information, the packet size, and the destination station ID of the respective data packets which are held in the transmission buffer 22. Based on the address information, the data packet management block 27 identifies the data packet, which is input at the earliest time among the respective data packets held in the transmission buffer 22, as a head data packet. Other data packets, which can be transmitted at the same time when the head data packet is transmitted, are selected as data packets to be transmitted simultaneously.

Here, 'other data packets which can be transmitted at the same time when the head data packet is transmitted' means that data packets that have the substantially same packet time length (time required for transmission) as the head data packet and can be transmitted and received without receiving an effect of the leakage power between radio channels even though transmitted simultaneously. The packet time length is calculated from a transmission rate and a packet size. However, the respective data packets whose destinations are different have different communication paths. Therefore, there is a case where transmission rates which are used in communication for the respective ones of destinations also differ. Accordingly, the transmission rate management block 32 manages transmission rate information for the respective ones of receiver terminals. As a practical matter, the transmission rate information which has been used in the past data transmission is distinguished into radio channels (CH1 and CH2) and the respective receiver terminals to be held by the transmission rate management block 32.

The data packet management block 27 refers to a request from the packet switching block 24 and recognizes the number of packets which can be transmitted simultaneously. Next, the data packet management block 27 refers to the transmission rate information, which is held in the transmission rate management block 32, and the management information, which is held in the transmission buffer 22 and related to the respective data packets. Then, the data packet management block 27 selects other data packets which have the substantially same packet time length as the head data packet, based on the packet sizes and the transmission rates of the respective data packets.

The transmission rate which is held by the transmission rate management block 32 is the maximum transmission rate to satisfy a required transmission quality and, as a practical matter, other transmission rates lower than that can be also used. Accordingly, the data packet management block 27 calculates transmission times for the respective data packets with respect to other selectable transmission rates lower than the transmission rate which is held by the transmission rate management block 32 and then, selects all the data packets which have the substantially same time required for transmission as the head data packet.

Next, the data packet management block 27 outputs into the transmission buffer 22 address information of one data packet or a plurality of data packets as many as the number of packets requested from the packet switching block 24, among the selected data packets. In other words, the data packet management block 27 grants to the transmission buffer 22 the address of the head data packet and the addresses of the selected data packets to satisfy the above-described condition. At the same time, the data packet management block 27 grants information representative of the transmission rates of the respective data packets to the packet switching block 24. In addition, the data packet management block 27 outputs the number of the selected data packets to the channel selection block 23.

When the respective data packets are made to be associated with the respective radio channels, the packet switching block 24 grants the transmission rate information input from the data packet management block 27 to the transmission rate selection block 31 of the corresponding radio channel.

Into the respective input terminals of the channel selection block 23, are input carrier detection results of the respective radio channels which the carrier sense blocks 17 in the respective transmit/receive processing block 10 detect, the number of data packets (the number of the data packets whose time required for transmission is the substantially same as the head data packet) which the data packet management block 27 outputs, and information of transmission state in the respective radio channels, which the transmission state management blocks 18 of the respective transmit/receive processing block 10 outputs.

The channel selection block 23 determines the number of data packets to be transmitted simultaneously based on these input information, selects radio channels to be used for the transmissions of the data packets, and outputs the results to the packet switching block 24.

Herein, a radio channel in which a carrier is not detected and which is not in transmission processing is called an idle channel. In addition, the time required for monitoring a carrier in order to determine whether a carrier is detected or not is assumed to be a specified time T which is calculated by a predetermined equation.

In the STA of the present configuration example, when the number of idle channels is more than the number of data packets notified from the data packet management block 27, the channel selection block 23 determines the number of data packets as the number of data packets to be transmitted simultaneously and further, selects as many radio channels as the number of the data packets from the idle channels to notify the results to the packet switching block 24.

When the number of idle channels is less than the number of the data packets notified from the data packet management block 27, the channel selection block 23 determines the number of idle channels as the number of data packets to be transmitted simultaneously and further, selects all the idle channels to notify the result to the packet switching block 24.

According to the number of the transmission data packets to be acquired from the selection results of the radio channels notified from the channel selection block 23, the packet switching block 24 outputs to the data packet management block 27 a request that as many data packets as the number of the transmission data packets are read from the transmission buffer 22. In accordance with the request input from the packet switching block 24, the data packet management block 27 outputs to the transmission buffer 22 address information of one data packet or a plurality of data packets as many as the number of data packets requested as described above.

The transmission buffer 22 reads all the respective data packets, which are in the addresses to be specified by the respective address information input from the data packet management block 27, from the data packets held therein. Then, the transmission buffer 22 outputs the data packets to the packet switching block 24 and further, deletes the corresponding data packets therefrom.

The packet switching block 24 associates one by one radio channels, which differ from each other among the radio channels notified from the channel selection block 23, with the respective data packets input from the transmission buffer 22.

When a plurality of data packets are input to the packet switching block 24, the corresponding data packets are simultaneously outputted to the respective modulators 11 of the plurality of transmit/receive processing block 10 (only block corresponding to the selected radio channel), in order to transmit the plurality of data packets simultaneously using a plurality of radio channels selected at the same timing. In addition, the packet switching block 24 outputs the signal, representing that transmissions of the data packets have been commenced by use of the plurality of selected radio channels, to the transmission state management blocks 18 of the transmit/receive processing blocks 10 corresponding to the selected radio channels.

In addition, when the number of data packets input to the packet switching block 24 is only one, the packet switching block 24 transmits the data packet to the modulator 11 of one transmit/receive processing block 10 corresponding to one selected radio channel and then, outputs the signal, representing that transmission of the data packet have been commenced by use of one selected radio channel, to the transmission state management block 18 of the same transmit/receive processing block 10.

When the modulator 11 inside each of the transmit/receive processing blocks 10 receives the data packet from the packet switching block 24, the modulator 11 modulates the data packet in a predetermined manner to output it the transmitter 12. In addition, the signal according to the transmission rate selected by the transmission rate selection block 31 is input to the modulator 11. The transmission rate selection block 31 determines a transmission rate to be actually used among a plurality of available transmission rates, but the selection condition is determined by a signal to be output by the transmission state management block 18 and a transmission rate to be input from the packet switching block 24.

For example, when the data packet management block 27 selects a plurality of data packets having the same packet time length, the data packets, which satisfy the condition at the transmission rate lower than the maximum transmission rate held in the transmission rate management block 32, are transmitted. In this case, the information of the transmission rates which satisfy the condition is output from the data packet management block 27 to be input to the transmission rate selection block 31 through the packet switching block 24. At this moment, even when the data packets are transmitted to the same destination through the same radio channel as that in the previous transmission, the transmission rate selection block 31 switches over the transmission rate to be used to a newly assigned transmission rate.

Each of the transmitters 12 performs transmission processing including DA conversion, frequency conversion, filtering, and power amplification with respect to the modulated data packet input from the modulator 11. Each of the transmitters 12 performs the transmission processing corresponding to one radio channel assigned in advance. The data packet in which the transmission processing is performed by the transmitter 12 is transmitted as a radio signal through the antenna 13.

When a plurality of data packets are input simultaneously to the packet switching block 24, these data packets are processed simultaneously by the plurality of transmit/receive processing blocks 10 associated with a plurality of radio channels, respectively. Then, the transmissions of the processed data packets are commenced simultaneously as radio signals through a plurality of radio channels. In addition, when MIMO is used, a plurality of data packets are transmitted simultaneously through one radio channel.

When two data packets are input simultaneously to the packet switching block 24, the transmissions of the data packets are commenced simultaneously by use of two radio channels. In addition, since the data packet (1) and the data packet (2) to be transmitted simultaneously are selected by the data packet management block 27 so as to have the substantially same packet time lengths (time required for transmission), transmission of the respective data packets are completed simultaneously in two radio channels.

Figure 20:
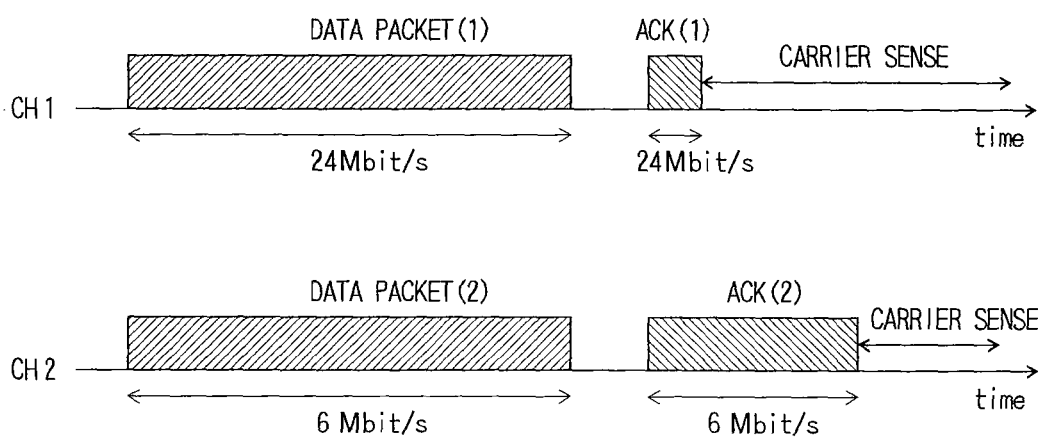
FIG. 20 is a time chart explaining a problem in the case where transmission rates of a plurality of radio channels are different.
Figure 21:
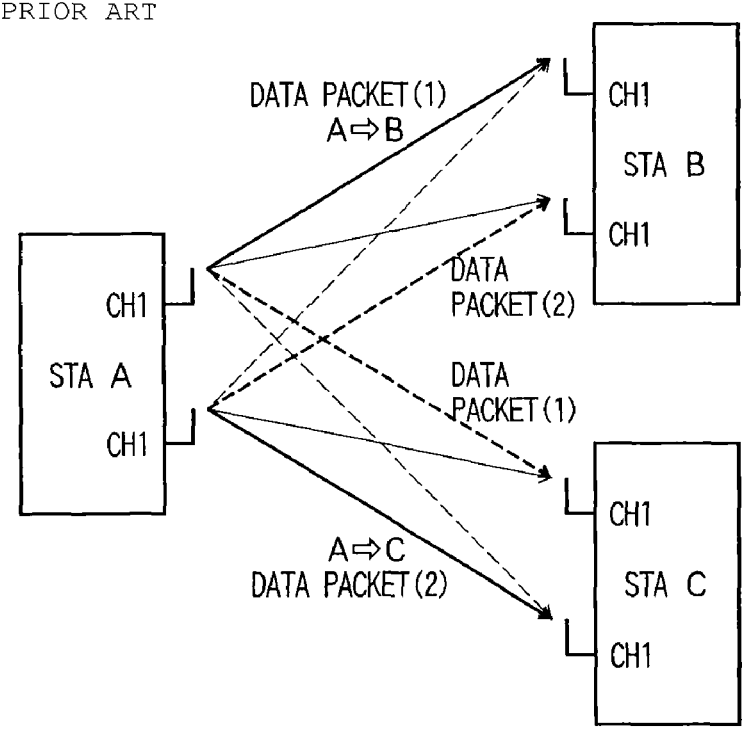
FIG. 21 is a time chart explaining a problem in the case where the MIMO is used.

Moreover, when transmission rates differ from each other in two radio channels, the difference between the packet time lengths (transmission times) of acknowledgment signals ACK (1) and ACK (2) with respect to the respective data packets occurs, as shown in FIG. 20. Therefore, in order to solve the problem, a special device is necessary. This will be described later.

Meanwhile, when the radio signals which other STAs transmit are transmitted through radio channels which are allocated to any one of the respective transmit/receive processing blocks 10-1, 10-2, ..., the electric waves of the radio signals are received by the antenna 13 of the corresponding transmit/receive processing block 10 to be input to the receiver 14. When the radio signals of the previously allocated radio channel are input from the antenna 13, the receiver 14 performs reception processing including frequency conversion, filtering, orthogonal detection, and AD conversion with respect to the input radio signals.

The receiver 14 of each of the transmit/receive processing blocks 10-1, 10-2, ... performs reception processing corresponding to the previously allocated radio channels. In addition, when the antenna 13 connected to the receiver 14 is not used for transmission, the receiver 14 of each of the transmit/receive processing block 10-1, 10-2, ... always receive radio signals on the radio path including the allocated radio channel through the antenna 13, regardless of the existence of the data packets which other STAs transmit. The receiver 14 performs appropriate reception processing in accordance with the existence of the data packets.

When the data packets are received through the allocated radio channel, base band signals corresponding to the received radio signals are output from the receiver 14. In addition, in the allocated radio channel, an RSSI signal representative of the reception electric field intensity of received signal is output from the receiver 14. Regardless of whether the data packets are transmitted through the corresponding radio channel or not, the RSSI signal is always output from the receiver 14, unless the connected antenna 13 is in transmission.

The received signal and the RSSI signal output from the receiver 14 are input to the demodulator 15 and the carrier sense block 17, respectively. If the RSSI signal is input, the carrier sense block 17 compares the value of the reception electric field intensity represented by the signal to a predetermined threshold value. Then, when a state continues where the reception electric field intensity is continuously smaller than the threshold value during a time (T) to be calculated by a predetermined method, it is determined that the allocated radio channel is idle and otherwise, it is determined that the allocated radio channel is busy. Each of the carrier sense blocks 17 outputs the determination result as carrier detection results CS1, CS2, .... Further, the time T may be changed in each case but, in the present example, the time T is assumed as a constant value for simplicity.

In addition, in each of the transmit/receive processing block 10, the RSSI signal is not input to the carrier sense block 17 when the antenna 13 is in a transmission state. When the antenna 13 is already in a transmission state, other data packets cannot be transmitted simultaneously as radio signals by use of the same antenna 13. Accordingly, when the RSSI signal is not input, each of the carrier sense blocks 17 outputs the carrier detection result showing that the allocated radio channel is busy. The carrier detection results CS1, CS2, ..., which are outputted from the carrier sense blocks 17 of the respective radio channels, are input to the channel selection block 23.

In addition, the transmission state management blocks 18 of each of the transmit/receive processing blocks 10 holds information indicating whether the own station can performs transmission processing by using the allocated radio channel or not and outputs the information to the channel selection block 23.

The frame selection block 16 first identifies the type of the packet input from the demodulator 15. In other words, since each of the packet headers includes the packet-type information as shown in FIG. 2, the frame selection block 16 refers to the information to identify whether the input packet is a data packet or an acknowledgment packet (ACK packet).

When an ACK packet is received, the frame selection block 16 refers to a transmit-side station ID included in the ACK packet to identify whether it corresponds to the own station ID. When the transmit-side station ID of the ACK packet corresponds to the own station ID, the signal showing that the ACK packet is received is output to the transmission state management block 18 of the transmit/receive processing block 10 associated with the radio channel used when the corresponding packet has been transmitted. Otherwise, the received packet is discarded. When the signal showing that a ACK packet is received from the frame selection block 16 is input, the transmission state management block 18 recognizes that transmission processing for the data packet transmitted just before is completed, using the corresponding radio channel. Then, the transmission state management block 18 updates and holds the transmission state corresponding to each of the radio channels. After that, the transmission state management block 18 outputs the transmission state of the radio channel held therein to the channel selection block 23.

Meanwhile, when the packet input to the frame selection block 16 is a data packet, it is identified whether the input data packet is transmitted to the own station. In other words, each of the data packets includes a destination station ID as a header, as shown in FIG. 2. Therefore, by checking whether the ID corresponds to the own station ID, it can be identified whether each of the data packets is addressed to the own station. When the data packet input to the frame selection block 16 is the packet transmitted to the own station, the frame selection block 16 outputs the corresponding packet to the ACK packet generating block 19 and the packet order management block 25. In addition, when packets not addressed to the own station are detected, the frame selection block 16 discards the packets.

When the data packet is input from the frame selection block 16, the ACK packet generating block 19 extracts the transmit-side station ID from the header of the data packet to generate an ACK packet including the ID shown in FIG. 2. The ACK packet generated by the ACK packet generating block 19 is modulated by the modulator 11. Then, similarly to the case where the data packet is transmitted, the modulated ACK packet is processed by the transmitter 12 to be transmitted as a radio signal from the antenna 13.

The packet order management block 25 checks a sequence number added to each of the input data packets and rearranges the plurality of received data packets in appropriate sequence, that is, in an order of the sequence number. The packet order management block 25 outputs the result as a received data packets to the data frame extraction block 26. The data frame extraction block 26 removes the header part from each of the data packets included in the input data packet sequence, that is, control information including packet-type information, a destination station ID, a transmit-side station ID and a sequence number and then, extracts an original data frame to outputs it as the received data frames.

[Transmission Processing Procedure (1)]

Figure 3:
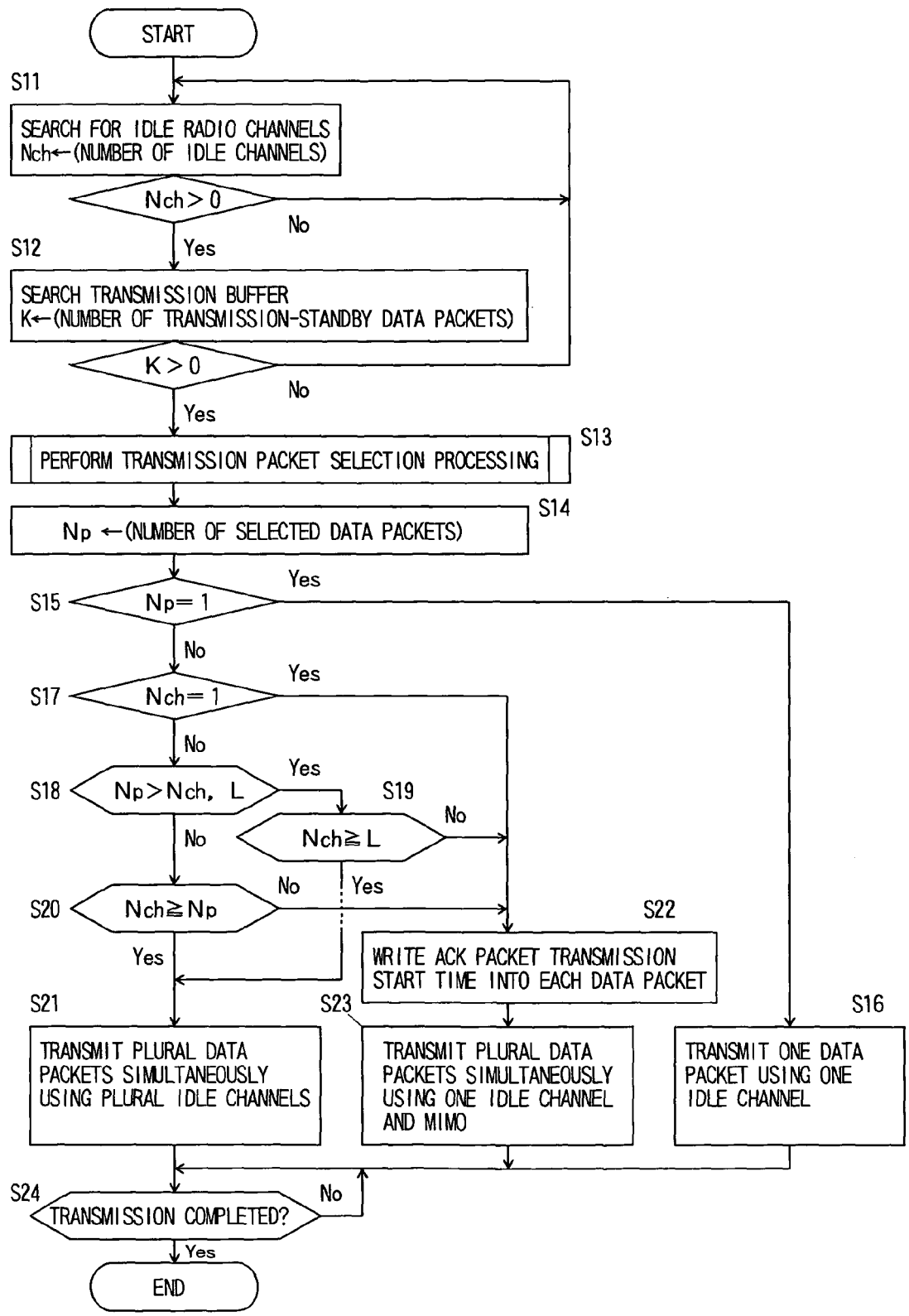
FIG. 3 is a flow chart showing a transmission processing procedure (1) in a wireless packet communication method of the invention.
Figure 4:
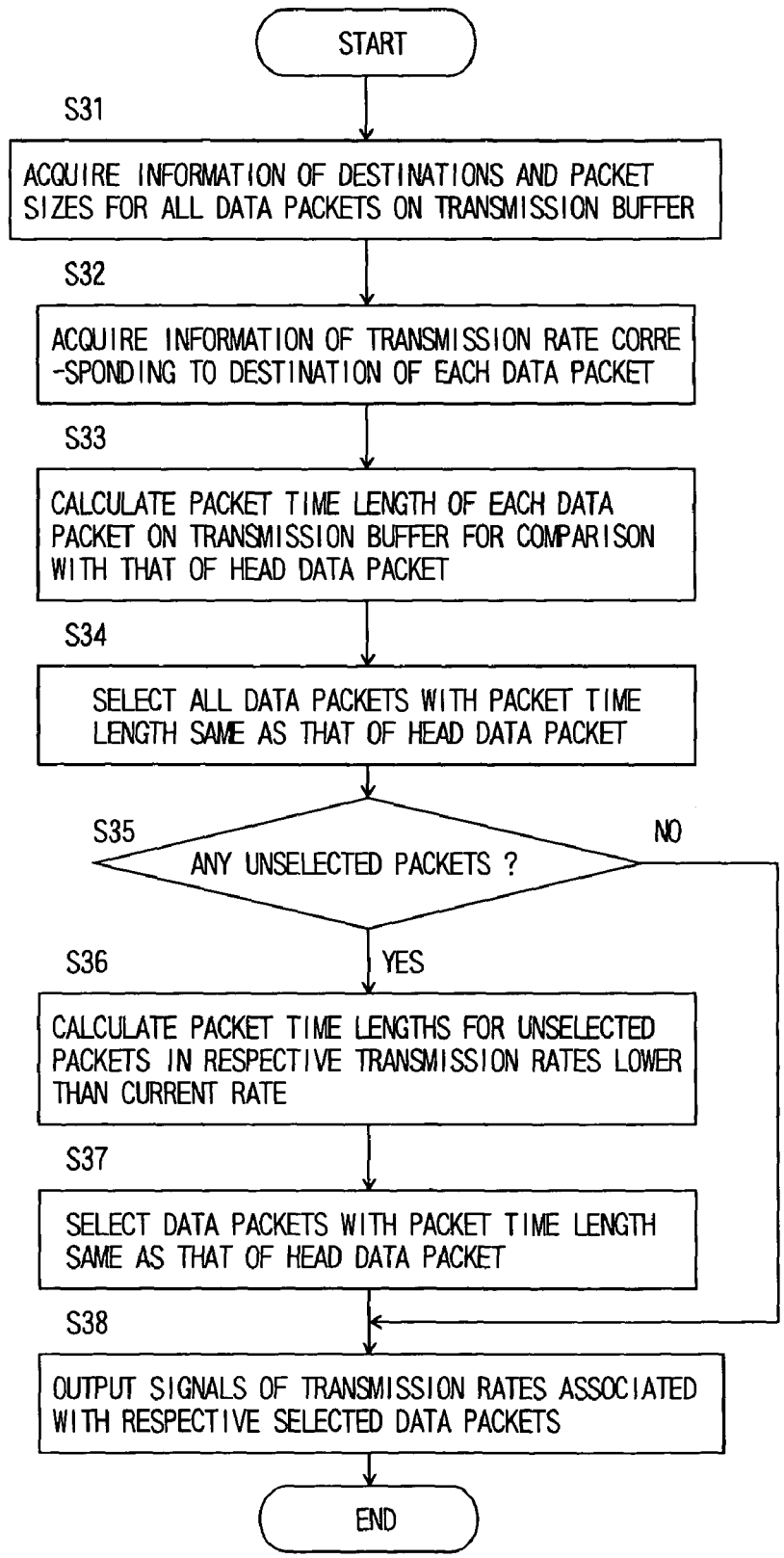
FIG. 4 is a flow chart showing a transmission processing procedure (1) in the wireless packet communication method of the invention.
Figure 5:
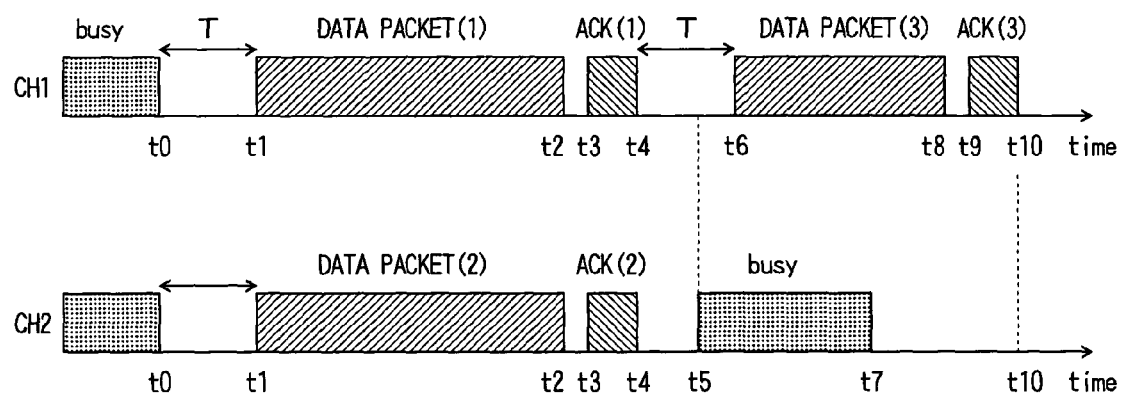
FIG. 5 is a time chart showing an operational example of the transmission processing procedure (1).

FIGS. 3 and 4 show a transmission processing procedure (1) in a wireless packet communication method of the present invention. FIG. 5 shows an operational example of the transmission processing procedure (1)

In Step S11 of FIG. 3, idle radio channels are searched among available all radio channels by carrier sense. As a practical matter, by using the carrier sense block 17 of each of the respective transmit/receive processing blocks 10, an idle condition of radio channel for each channel is detected and the number of detected idle channels is set to Nch. When more than one idle channel are detected, the transmission buffer 22 is searched in Step S12 and the number (K) of transmission-standby data packets is acquired. When there is no data packet waiting to be transmitted (K=0), the process returns to the carrier sense. When the number (K) of transmission-standby data packets is more than one, the process proceeds to the next.

In Step S13, selection processing on the packets to be sent shown in FIG. 4 is executed to select one data packet or a plurality of data packets to be transmitted at the next timing among the transmission-standby data packets on the transmission buffer 22. The processing is executed by the data packet management block 27 of FIG. 1.

In Step S31 of FIG. 4, management information on the transmission buffer 22 is acquired. In other words, address information of each data packet held on the transmission buffer 22 and information on the stored data packets in which the destinations and the packet sizes are associated with each other are acquired for all the data packets. In Step S32, transmission rate information of the respective data packets associated with destinations is acquired from the transmission rate management block 32. In Step S33, based on the packet sizes acquired in Step S31 and the transmission rates acquired in Step S32, packet time lengths (time required for transmission) of the respective data packets on the transmission buffer 22 are obtained. The packet time length is calculated by (packet size/transmission rate). In addition, in Step S33, the packet time length of the head data packet on the transmission buffer 22 (data packet which is input into the transmission buffer at the earliest time) is compared to the packet time lengths of the rest of data packets in the transmission buffer 22.

In Step S34, all the data packets having the substantially same packet time lengths as that of the head data packet are selected. In Step S35, it is identified whether data packets not selected in Step S34 exist in the transmission buffer 22 or not. When there is any data packet, the process proceeds to the next step S36. Otherwise, the process proceeds to Step S38.

In the meantime, transmission rate for each destination which is held in the transmission rate management block 32 is the maximum value of available transmission rate. Accordingly, even though other transmission rates lower than the transmission rate acquired from the transmission rate management block 32 are used, problems do not arise in general. Subsequently, in Step S36, for the respective data packets remaining on the transmission buffer 22 which are not selected in Step S34 and for all the selectable transmission rates lower than the transmission rate acquired from the transmission rate management block 32, the packets lengths are obtained, respectively.

In Step S37, the packet time lengths of transmission rates of the respective data packets obtained in Step S36 are compared to the packet time length of the head data packet obtained in Step S33. Then, the data packets having the substantially same packet time lengths as the head data packet are selected.

In Step S38, transmission rate signals which are associated with the respective data packets selected in Steps S34 and S37 are output from the data packet management block 27 to be granted to the transmission rate selection block 31 of the transmit/receive processing block 10 of the corresponding channel through the packet switching block 24. For the data packets selected in Step S34, the transmission rates acquired from the transmission rate management block 32 are output as they are. However, for the data packets selected in Step S37, the transmission rates are output, which are used for calculating the packet time lengths which correspond to each other when the packet time lengths are compared.

In Steps S14 and S15 of FIG. 3, the number (Np) of data packets selected through the processing of Step S13 is acquired and checked. Here, in the case of Np=1, the process proceeds to Step S16, so that one selected data packet is transmitted by using one idle channel.

In the case of Np>1 in Step S15, the process proceeds to Step S17, so that the number (Nch) of idle channels detected in Step S11 is checked. In the case of Nch>1, the process proceeds to Step S18, so that the number (Np) of the data packets selected in Step S14 is compared to the number (Nch) of idle channels and available MIMO number L. In the case of Np>Nch and Np>L, the process proceeds to Step S19, so that the number (Nch) of idle channels is compared to the available MIMO number L. Meanwhile, in the case of Np≦Nch or Np≦L in Step S18, the process proceeds to Step S20, so that the number (Nch) of idle channels is compared to the number (Np) of data packets selected in Step S14.

In the case of Nch≧L in Step S19 and in the case of Nch≧Np in Step S20, the process proceeds to Step S21, so that the plurality of data packets selected in Step S13 are transmitted simultaneously using the plurality of idle channels detected in Step S11 simultaneously.

Meanwhile, in the case of Nch=1 in Step S17, Nch<Np in Step S19, or Nch<Np in Step S20, the process proceeds to Step S22, so that information indicating the times when the respective receiver terminals of the data packets starts to transmit ACK are stored in the respective data packets, based on the transmission rates acquired from the transmission rate management block 32. Next, the process proceeds to Step S23, so that the plurality of data packets selected in Step S13 are multiplexed by MIMO and transmitted simultaneously by using one idle channel.

In the case of Nch<Np in Step S20, transmissions of a plurality (sum of the respective MIMO numbers L of Nch) of data packets may be commenced simultaneously, by using Nch idle channels and MIMO.

After transmissions of the data packets are commenced in Step S16, S21, or S23, the process stays in Step S24 until transmissions of the data packets is completed in all the radio channels. Then, the process returns to Step S11. As a practical matter, by monitoring the information which the transmission state management blocks 18 of the respective transmit/receive processing block 10 output, it can be confirmed in Step S24 whether there is any radio channel where the own station does not complete transmissions. Moreover, it may be omitted for Step S24.

According to the transmission processing procedure described above, for example, there simultaneously exist two radio channels CH1 and CH2t, which are in an idle state during a predetermined time T between t0 and t1 shown in FIG. 5. Therefore, by using these radio channels CH1 and CH2 simultaneously, two data packets (1) and (2) different from each other can be transmitted simultaneously.

In addition, acknowledgment signals ACK (1) and ACK (2) for the data packets (1) and (2) are received between t3 and t4. At the time of t6, even though two data packets including a data packet (3) wait to be transmitted, only the data packet (3) can be transmitted because the available one radio channel CH2 is busy.

Here, when Step S24 of FIG. 3 is executed, new transmissions cannot be performed when packets are transmitted through any radio channel. Even though the radio channel CH2 is not busy at the time t7 in FIG. 5, the next data packet can not be transmitted immediately. Accordingly, at the time when an acknowledgment signal ACK (3) for the data packet (3) is received and all the channels are not in the transmission state, the transmission of the next data packet is commenced.

However, when transmission power leakage occurs between a plurality of radio channels, it is very likely that a signal (for example, ACK packet) to be received when the own station transmits through other adjacent channels fail to be received due to an effect of the transmission power leakage from the adjacent channels. However, in Step S13 of FIG. 3 (Steps S31 to S38 of FIG. 4), as a data packet to be transmitted, a plurality of data packets whose time required for transmission are approximately equal to each other are selected. The time required for transmission is the packet time length to be calculated from the transmission rate and the packet size. Therefore, as shown in FIG. 5, the transmissions of the data packets (1) and (2) which are commenced at the time of t1 are all completed at the time of t2.

In addition, generally, the time from when the transmission of a data packet is completed until the reception of ACK is commenced is constant, regardless of the packet time length of the data packet. Therefore, the timing (between t3 and t4) when the acknowledgment signal ACK (1) for the data packet signal (1) is received becomes the same as the timing (between t3 and t4) when the acknowledgment signal ACK (2) for the data packet (2) is received. Accordingly, without receiving any effect of the transmission power leakage, the ACK (1) and the ACK (2) can be received.

Further, when a plurality of data packets to be transmitted simultaneously do not have the same packet time lengths, the time when the transmissions of the data packets (1) and (2) are completed differs as much as a difference in the packet time length. Therefore, even the timing when the ACK (1) and the ACK (2) are received differs as much as a difference in the packet time length. However, if the difference between the packet time lengths of the data packets (1) and (2) is sufficiently small and the difference between transmission completion times of the respective data packets is smaller than the time from when the transmission of a data packet is completed until the reception of ACK is commenced, the ACK (1) and the ACK (2) can be transmitted without receiving any effect of the transmission power leakage. Accordingly, if the packet time lengths of the data packets to be selected simultaneously in Step S13 do not completely correspond to each other but the difference between the packet time lengths is sufficiently small, problems do not arise.

As such, when there are a plurality of idle channels at the same time or when MIMO is used, a plurality of data packets can be transmitted simultaneously. Therefore, the number of data packets which can be transmitted per unit of time can significantly increase and throughput is improved. Further, when a plurality of data packets are transmitted simultaneously to different destinations by using MIMO, the transmission start time of ACK packets from the respective destinations needs to be scheduled, but it will be described later.

[Transmission Processing Procedure (2)]

Figure 6:
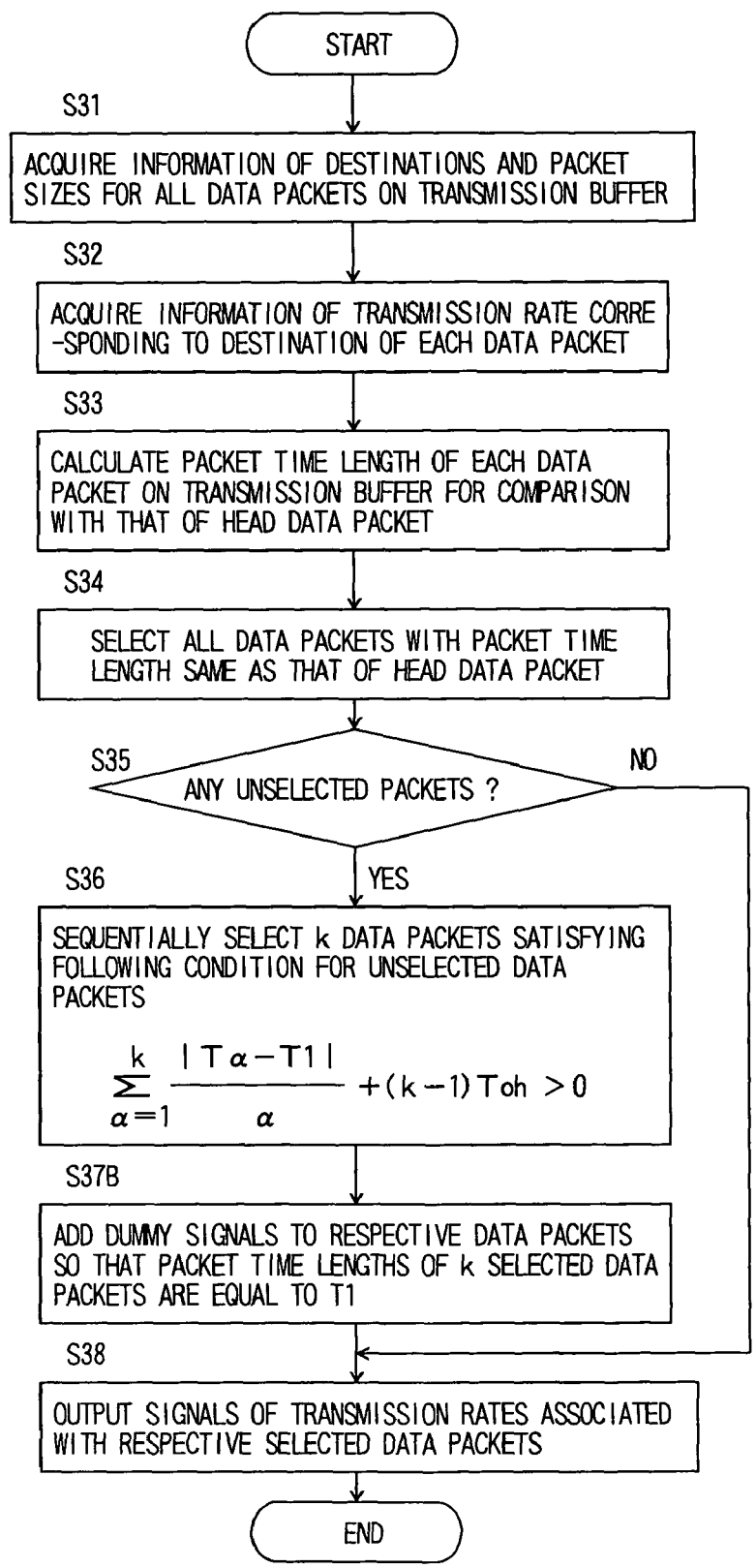
FIG. 6 is a flow chart showing a transmission processing procedure (2) in the wireless packet communication method of the invention.

FIG. 6 shows a transmission processing procedure (2) in the wireless packet communication method of the present invention. In the transmission processing procedure (2), Steps S36 and S37 of the transmission processing procedure (1) in FIG. 4 are changed into Steps S36B and S37B in FIG. 6. The changed part will be described.

In Step S36B, for unselected data packets, k data packets to satisfy a conditional expression are sequentially selected. In this conditional expression, T1 represents a packet time length of the head data packet on the transmission buffer, Toh represents an overhead time, and Tα represents packet time lengths of the data packets other than the head data packet. The conditional expression is used for performing the comparison between transmission efficiencies of two modes, as described later. In Step S37B, a dummy signal is added to each of the k data packets so that all the packet time lengths (transmission times) of k data packets selected in Step S36B are equal to T1.

Next, the reason why such processing is performed will be described. For example, when there are two data packets having different packet time lengths and two radio channels are in an idle state, it is considered that two types of modes shown in FIG. 7 are adopted so that two data packets having the substantially same packet time lengths are simultaneously transmitted. That is, in the mode 1, a dummy signal is added to the second packet having a short packet time length (T2), the substantial packet time length of the second packet is fitted in the packet time length (T1) of the head packet, and then two data packets are transmitted simultaneously. In the mode 2, each packet is divided equally into two packets so that data packets having different packet time lengths (T1/2 and T2/2) are generated. Then, the head packet and the second packet are transmitted in twice.

Herein, the transmission efficiency of the mode 1 can be represented by (T1+Toh) and the transmission efficiency of the mode 2 can be represented by ((T2+T1)/2+2×Toh). Further, since the overhead time Toh is usually constant, it may be assumed to be a constant.

In the conditional expression of Step S35B, these transmission efficiencies are compared. That is, the left side of the conditional expression of Step S35B in the respective modes 1 and 2 is modified as below:

$\Sigma(|T\alpha-T1|)/\alpha+(k-1)\times Toh=((T1-T2)/2)+((T2-T1)/2)+Toh=((T1-T1)/2)+Toh$.

Accordingly, the conditional expression of Step S35B can be modified as below:

$((T2-T1)/2)+Toh>0$ $T2/2+T1/2+2\times Toh>T1+Toh$.

The left and right sides of this expression represent the transmission efficiencies of the modes 2 and 1 of FIG. 7, respectively. That is, with either mode selected, the mode having good transmission efficiency can be selected automatically.

[Reception Processing Procedure (1)]

Figure 8:
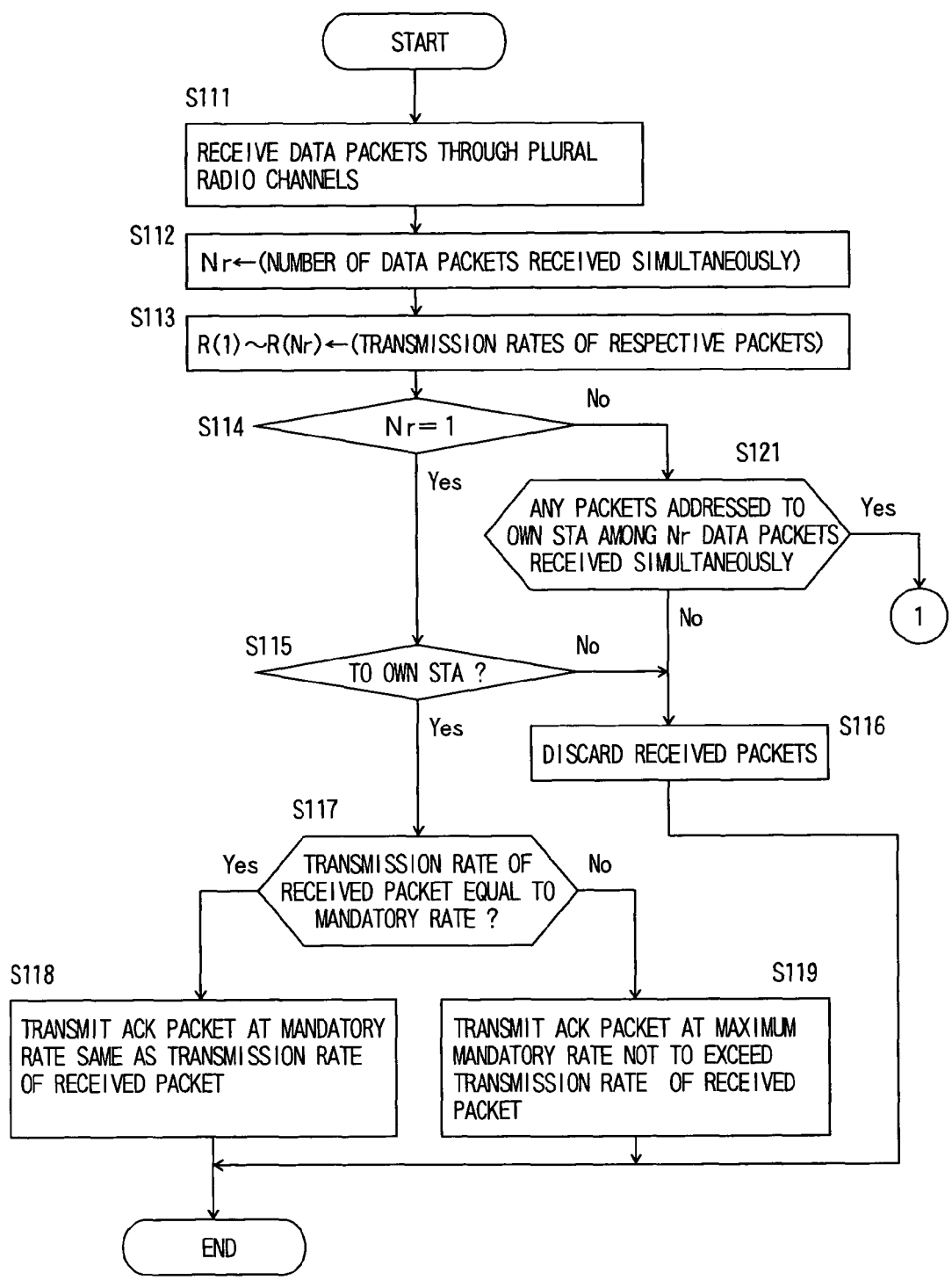
FIG. 8 is a flow chart showing a reception processing procedure (1) in the wireless packet communication method of the invention.
Figure 9:
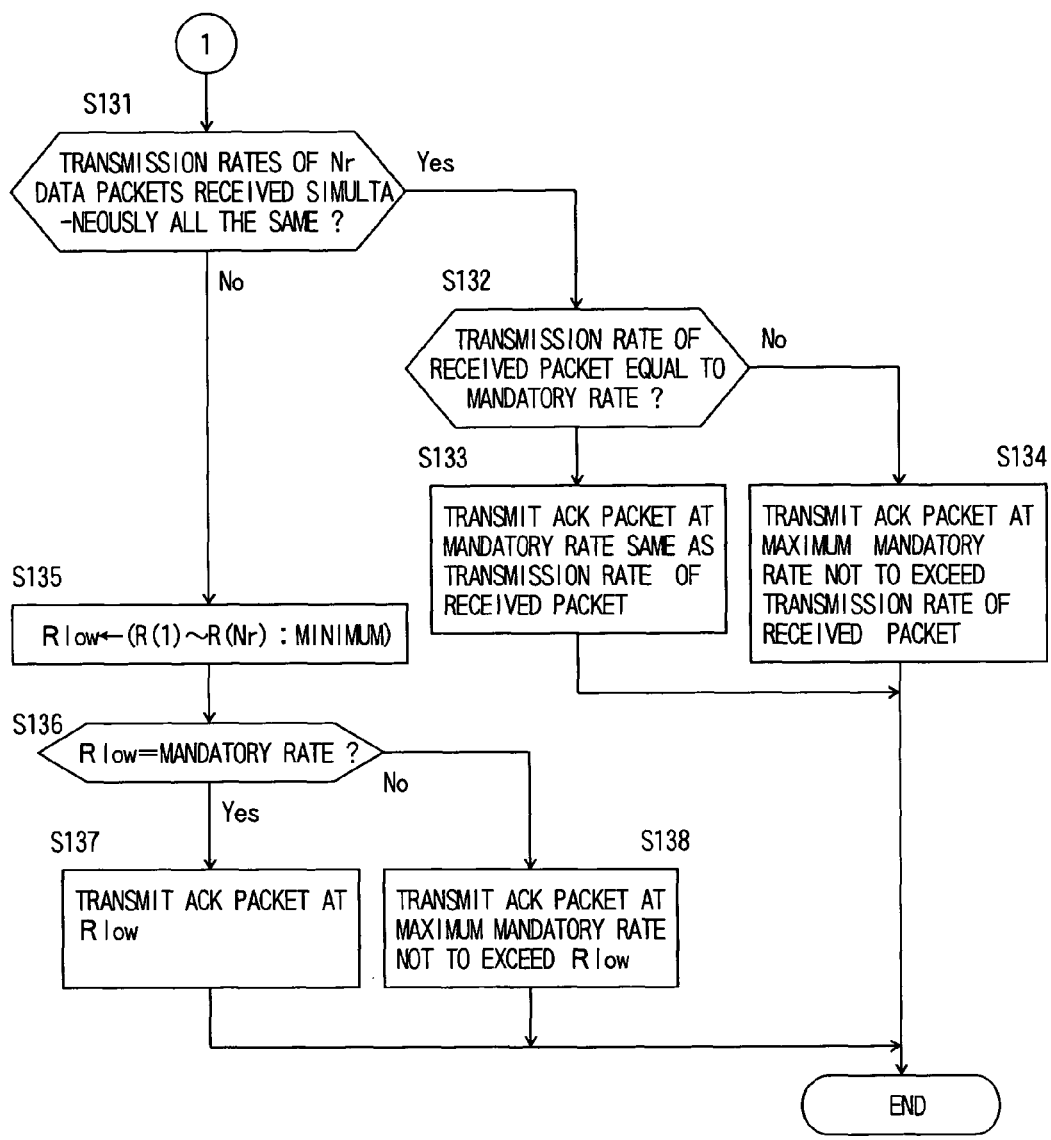
FIG. 9 is a flow chart showing a reception processing procedure (1) in the wireless packet communication method of the invention.
Figure 10:
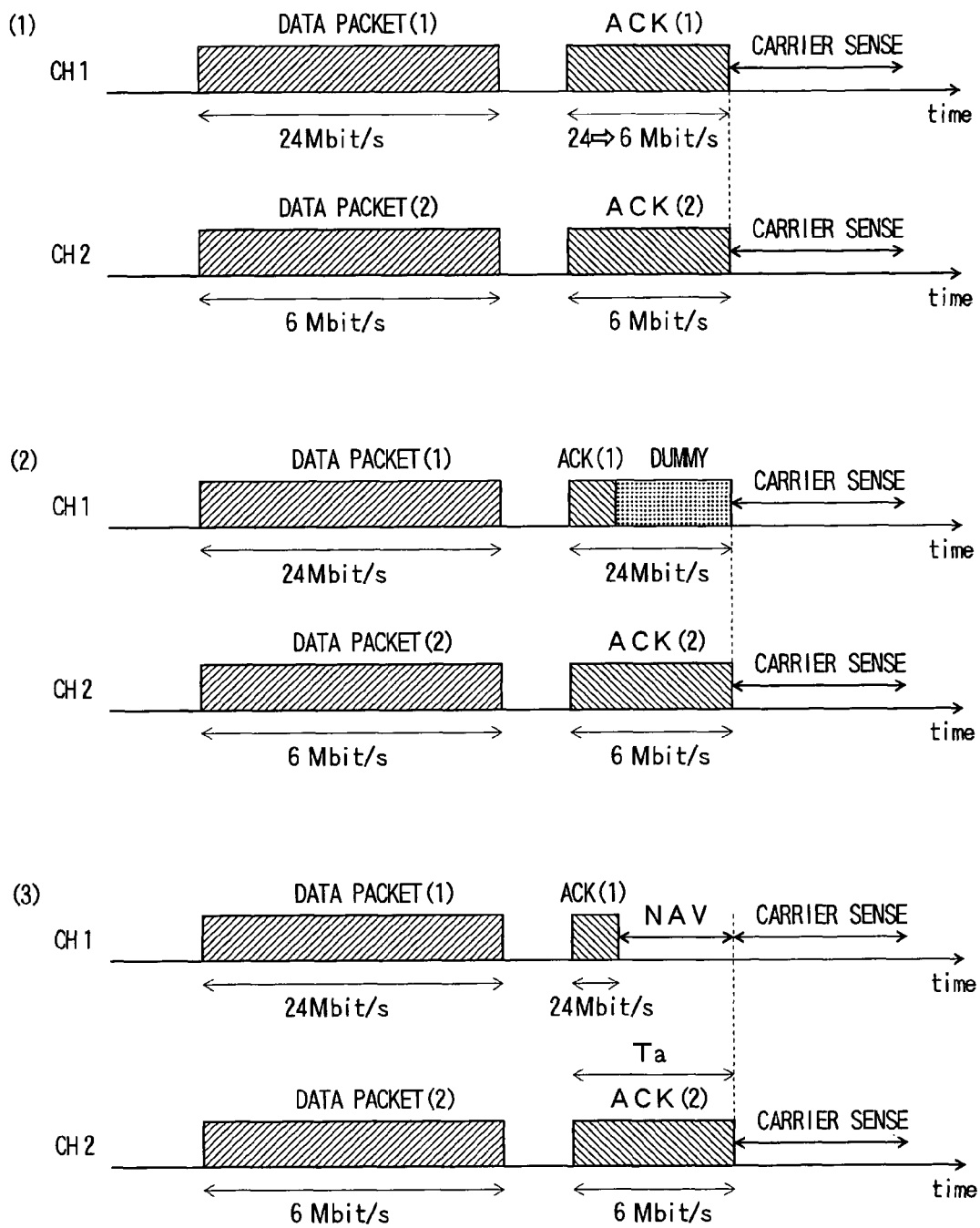
FIG. 10 is a time chart showing operational examples of reception processing procedures (1) to (3).

FIGS. 8 and 9 show a reception processing procedure (1) in the wireless packet communication method of the present invention. FIG. 10 shows operational examples of reception processing procedures (1) to (3). Here, since it is assumed that control in conformity with IEEE802.11 standards is performed, any one of M1, M2, and M3 which are mandatory rates is used as a transmission rate when an STA receiving data packets transmits an ACK packet.

In Step S111 of FIG. 8, reception processing of data packets is performed for a plurality of available radio channels in all the transmit/receive processing blocks 10. When data packets are received, the process proceeds to Step S112, so that the number (Nr) of data packets received simultaneously is acquired. In addition, in the next step S113, transmission rates R (1) to R (Nr) of the respective received Nr data packets are acquired.

In Step S114, the number (Nr) of data packets received simultaneously is checked. Then, in case of Nr=1, the process proceeds to Step S115, so that a destination station ID included in the received data packet is referred to and it is identified whether the packet is addressed to the own station. When the received data packet is not addressed to the own station, the process proceeds to Step S116 and the data packet is discarded to end the process. When the data packet addressed to the own station is received, the process proceeds to Step S117, so that it is checked whether the transmission rate of the received data packet is equal to the mandatory rate (any one of M1, M2, and M3) or not. Then, when the transmission rate is equal to any one of the mandatory rates, the process proceeds to Step S118. Otherwise, the process proceeds to Step S119.

In Step S18, the mandatory rate same as the transmission rate of the received data packet is selected. By use of the radio channel where the data packet is received at the mandatory rate, an ACK packet is transmitted toward the transmit-side station. In Step S119, the maximum mandatory rate which does not exceed the transmission rate of the received data packet is selected among M1, M2, and M3. By use of the radio channel where the data packet is received at the mandatory rate, an ACK packet is transmitted toward the transmit-side station.

When a plurality of data packets are received simultaneously, the process proceeds from Step S114 to Step S121, so that destination station IDs included in the respective data packet are referred to and it is identified whether the data packets are addressed to the own station. When the received data packets are not addressed to the own station, the process proceeds to Step S116, so that the data packets are discarded to end the process. When the data packets are addressed to the own station, the process proceeds to Step S131 of FIG. 9.

In Step S131 of FIG. 9, it is identified whether the transmission rates of the respective Nr data packets received simultaneously are all the same or not. When the transmission rates of Nr data packets are all the same, the process proceeds to Step S132. Then, it is checked whether the respective transmission rates of the received data packets are equal to the mandatory rates (M1, M2, and M3) or not. When any one of the transmission rates is equal to any one of the mandatory rates, the process proceeds to Step S133. Otherwise, the process proceeds to Step S134. In Step S133, the same mandatory rate as the transmission rate of the received data packet is selected. Then, by use of the radio channel where the data packet addressed to the own station at the mandatory rate is received, an ACK packet addressed to the transmit-side station is transmitted. In Step S134, the maximum mandatory rate which does not exceed the transmission rate of the received data packet is selected among M1, M2, and M3. Then, by use of the radio channel where the data packet addressed to the own station at the mandatory rate is received, an ACK packet addressed to the transmit-side station is transmitted.

Meanwhile, when it is determined that the transmission rates of the Nr received data packets by the identification in Step S131 are not all the same, the process proceeds to Step S135. Then, the minimum value among the transmission rates R(1) to R(Nr) is set to Rlow and, in Step S136, it is identified whether Rlow is equal to any one of the mandatory rates (M1, M2, and M3) or not. When Rlow is equal to any one of the mandatory rates, the process proceeds to Step S137. Otherwise, the process proceeds to the S138.

In Step S137, by use of the radio channel where the data packet addressed to the own station at Rlow (=the mandatory rate) is received, an ACK packet addressed to the transmit-side station is transmitted. In Step S138, the maximum mandatory rate which does not exceed Rlow is selected among M1, M2, and M3. Then, by use of the radio channel where the data packet addressed to the own station at the mandatory rate is received, an ACK packet addressed to the transmit-side station is transmitted.

By the above-described processing, an operation shown in FIG. 10(1) is realized. That is, through a radio channel CH1 whose transmission rate is 24 Mbit/s and a radio channel CH2 whose transmission rate is 6 Mbit/s, data packets (1) and (2) whose destinations are different are respectively transmitted simultaneously. In the STA which receives the data packets (1) and (2), the data packet addressed to the own station is received and further, the transmission rate of 6 Mbit/s is selected as Rlow. The STA which receives the data packet (1) switches over the transmission rate of the radio channel CH1 from 24 Mbit/s to 6 Mbit/s to transmit ACK (1). The radio channel which receives the data packet (2) transmits ACK (2) at the transmission rate 6 Mbit/s as it is, through the radio channel CH2. The above-described operation corresponds to Step S137 of FIG. 9.

In addition, since the size of ACK (1) is the same as the size of ACK (2) and the transmission rate used for transmissions of ACK (1) and ACK (2) is 6 Mbit/s, the packet time lengths of ACK (1) and ACK (2) are the same. Accordingly, the time when the transmission of ACK (1) is completed is the same as the time when the transmission of ACK (2) is completed, so that carrier sense of two radio channels CH1 and CH2 is commenced at the same time. Accordingly, in the transmission station of the data packets, the ACK packet transmitted through the respective radio channels can be reliably received and further, the transmissions between all the STAs are stopped, so that the right to transmit by the carrier sense after that can be impartially granted to the respective STAs.

[Reception Processing Procedure (2)]

Figure 11:
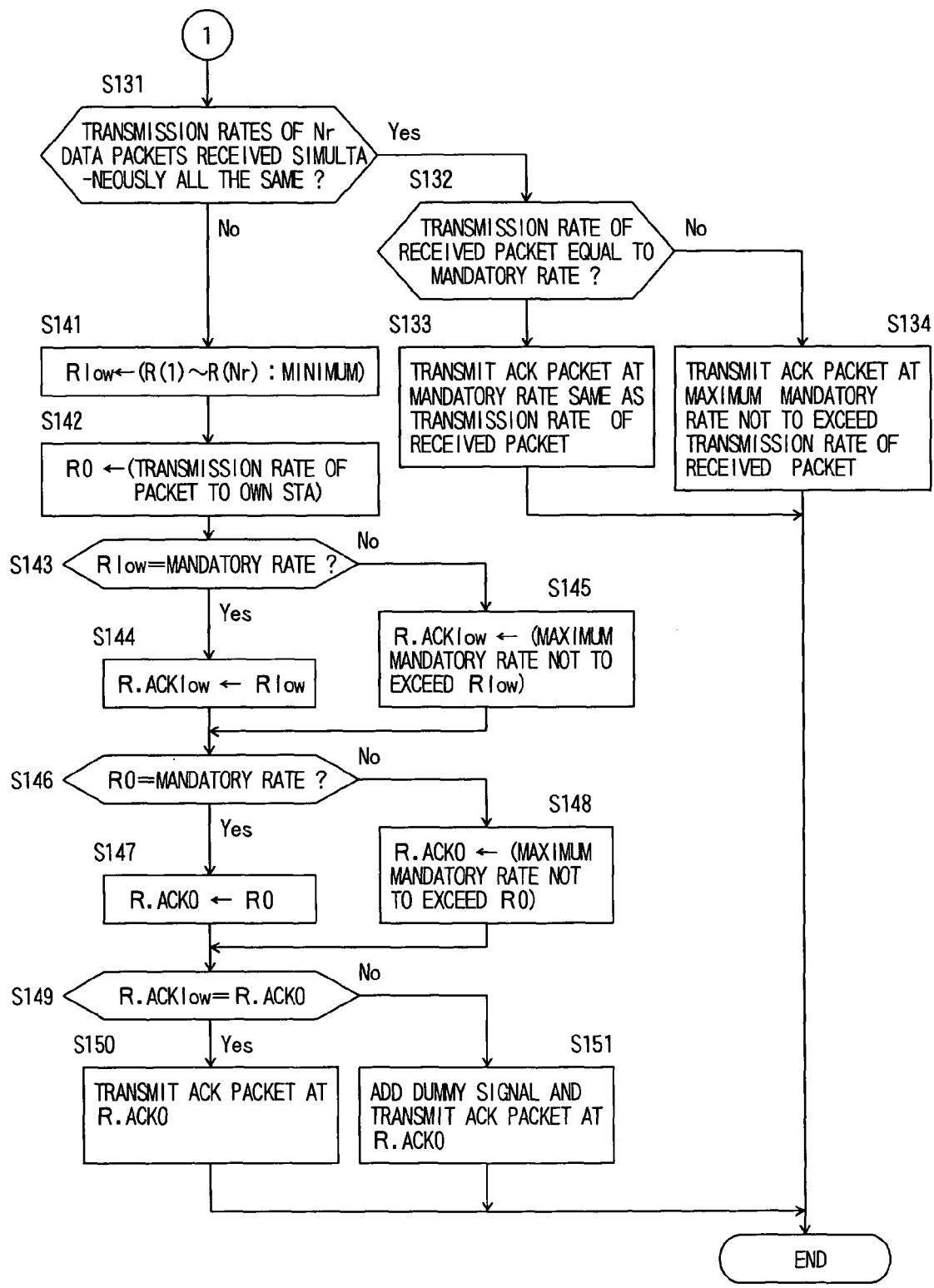
FIG. 11 is a flow chart showing a reception processing procedure (2) in the wireless packet communication method of the invention.
Figure 1:
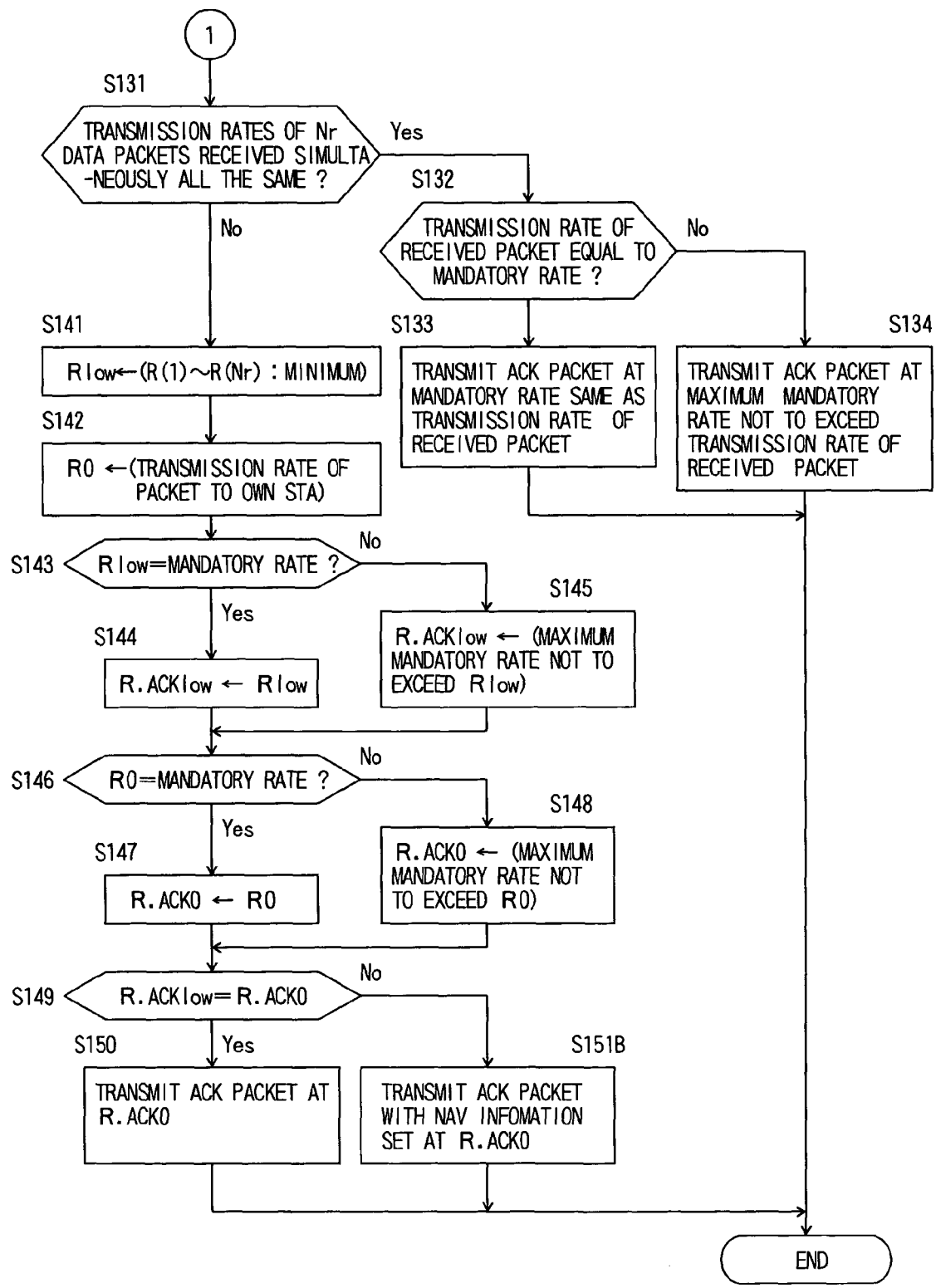

FIG. 11 shows a reception processing procedure (2) in the wireless packet communication method of the present invention. Since the reception processing procedure (2) has common in Steps S111 to S121 and Steps S131 to S134 of the reception processing procedure (1) shown in FIGS. 8 and 9, the reception processing procedure (Steps S111 to S121) corresponding to FIG. 8 is omitted here and only the reception processing procedure corresponding to FIG. 9 is shown. In addition, Steps S135 to S138 of FIG. 9 are substituted with Steps S141 to S151.

In Step S141, the minimum value among the transmission rates R(1) to R(Nr) of received Nr data packets is set to Rlow and, in the next step S142, the transmission rate of the data packet addressed to the own station is set to R0.

In Step S143, it is identified whether Rlow is equal to any one of the mandatory rates (M1, M2, and M3). When Rlow is equal to any one of the mandatory rates, the process proceeds to Step S144. Otherwise, the process proceeds to Step S145. In Step S144, Rlow is set to R.ACKlow and, in Step S145, the maximum mandatory rate which does not exceed Rlow among M1, M2, and M3 is set to R.ACKlow.

In the next step S146, it is identified whether the transmission rate R0 of the data packet addressed to the own station is equal to any one of the mandatory rates (M1, M2, and M3) or not. When R0 is equal to any one of the mandatory rates, the process proceeds to Step S147. Otherwise, the process proceeds to Step S148. In Step S147, R0 is set to R.ACK0 and, in Step 148, the maximum mandatory rate which does not exceed R0 among M1, M2, and M3 is set to R.ACK0.

In the next step S149, R.ACKlow is compared to R.ACK0. When both of them are equal, the process proceeds to Step S150. Otherwise, the process proceeds to Step S151.

In Step S150, by use of the radio channel where the data packet addressed to the own station is received, an ACK packet addressed to the transmit-side station is transmitted at the transmission rate R.ACK0. In Step S151, in order that the packet time length of ACK packet corresponding to the transmission rate R.ACK0 is equal to the packet time length of the ACK packet time length corresponding to the transmission rate R.ACKlow, a dummy signal having the length corresponding to the difference between them is added to the ACK packet. Then, by use of the radio channel where the data packet addressed to the own station is received, the ACK packet to which a dummy signal is added is transmitted at the transmission rate R.ACK0 toward the transmit-side station.

By the above-described processing, an operation shown in FIG. 10(2) is realized. That is, through a radio channel CH1 whose transmission rate is 24 Mbit/s and a radio channel CH2 whose transmission rate is 6 Mbit/s, data packets (1) and (2) whose destinations are different are respectively transmitted simultaneously. In the STA which receives the data packets (1) and (2), the data packet addressed to the own station is received and further, the transmission rate of 6 Mbit/s is selected as Rlow. The STA which receives the data packet (1) transmits ACK (1) at the transmission rate of 24 Mbit/s of the radio channel CH1. The STA which receives the data packet (2) transmits ACK (2) at the transmission rate of 6 Mbit/s of the radio channel CH2.

The size of ACK (1) is the same as the size of ACK (2), but the transmission rates (24 Mbit/s and 6 Mbit/s) used for transmissions of ACK (1) and ACK (2) are different. Therefore, the respective packet time lengths of ACK (1) and ACK (2) are also different. However, in the receiver terminal of the data packet (1), R.ACKlow is not equal to R.ACK0 in Step S149 of FIG. 11, so that the process proceeds to Step S151. Accordingly, to ACK (1) to be transmitted at the high transmission rate, a dummy signal corresponding to the difference between the packet time lengths of ACK (1) and ACK (2) is added to be transmitted, and so the packet time length of ACK (1) combined with a dummy signal becomes the same as that of ACK (2). Accordingly, since the packet time lengths of ACK (1) and ACK (2) substantially correspond to each other, the transmissions of them are completed at the same time and carrier senses of two radio channels CH1 and CH2 are commenced at the same time. As a result, in the transmission station of the data packet, the ACK packet transmitted through the low-rate radio channel can be reliably received and further, the transmissions between all the STAs are stopped, so that the right to transmit by the carrier sense after that can be impartially granted to the respective STAs.

[Reception Processing Procedure (3)]

FIG. 12 shows a reception processing procedure (3) in the wireless packet communication method of the present invention. The reception processing procedure (3) has common in Steps S111 to S121 and Steps S131 to S134 of the reception processing procedure (1) shown in FIGS. 8 and 9 and also has common in Steps S141 to S150 of the reception processing procedure (2) shown in FIG. 11. Therefore, the reception processing procedure (Steps S111 to S120) corresponding to FIG. 8 is omitted here and only the reception processing procedure corresponding to FIGS. 9 and 11 is shown. Further, Step S151 of FIG. 111 is substituted with Step S151B in FIG. 12.

In Step S149, when R.ACKlow and R.ACK0 are not equal to each other, the process proceeds to Step S151B, so that the packet time length value of an ACK packet corresponding to the transmission rate R.ACKlow is written into the duration field (refer to FIG. 2) of an ACK packet. Then, by use of the radio channel where the data packet addressed to the own station is received, the ACK packet is transmitted at the transmission rate R.ACK0 toward the transmit-side station.

In the STA with the IEEE802.11 standards, the time written into each duration field of the received data packet and ACK packet is identified as a transmission deferral duration (NAV). Until the period passes, transmission is not performed, but is in a standby state.

In the present reception processing procedure (3), an operation shown in FIG. 10(3) is realized. That is, through a radio channel CH1 whose transmission rate is 24 Mbit/s and a radio channel CH2 whose transmission rate is 6 Mbit/s, data packets (1) and (2) whose destinations are different are transmitted simultaneously. In the STA which receives the data packets (1) and (2), the data packet addressed to the own station is received and further, the transmission rate of 6 Mbit/s is selected as Rlow. The STA which receives the data packet (1) transmits ACK (1) at the transmission rate of 24 Mbit/s of the radio channel CH1. The STA which receives the data packet (2) transmits ACK (2) at the transmission rate of 6 Mbit/s of the radio channel CH2.

The size of ACK (1) is the same as the size of ACK (2), but the transmission rates (24 Mbit/s and 6 Mbit/s) to be used for transmissions of ACK (1) and ACK (2) are different. Therefore, the respective packet time lengths of ACK (1) and ACK (2) are also different. However, the STA which transmits an ACK packet at a transmission rate higher than Rlow executes Step S151B of FIG. 12. Therefore, in the duration field of ACK (1) of FIG. 10(3), wait time Ta (packet time length of ACK (2) to be transmitted at the transmission rate R.ACKlow) is written. Accordingly, according to the value of the duration field, the STAs including the receiver terminal of ACK (1), which receive ACK (1), wait until the transmission deferral duration (NAV) is completed even though the reception of ACK (1) is completed. Subsequently, until the transmission of ACK (2) having a long packet time length is completed, all the STA including the own station do not commence carrier sense. That is, in the transmission station of data packet, the ACK packet transmitted through the low-rate radio channel can be reliably received and further, the transmissions between all the STAs are stopped, so that the right to transmit by the carrier sense after that can be impartially granted to the respective STAs.

[Reception Processing Procedure (4)]

In the meantime, data packets from one transmit-side station whose destinations are different can be superposed through one radio channel by MIMO to be transmitted simultaneously and a plurality of receive-side stations which are destinations can receive data packets addressed to the own station, respectively. However, if ACK packets for the received data packets are returned simultaneously through the same radio channel by the plurality of receive-side stations which are destinations, the transmit-side station cannot receive the acknowledgment packets. A reception processing procedure (4) for solving such a problem will be described.

Figure 13:
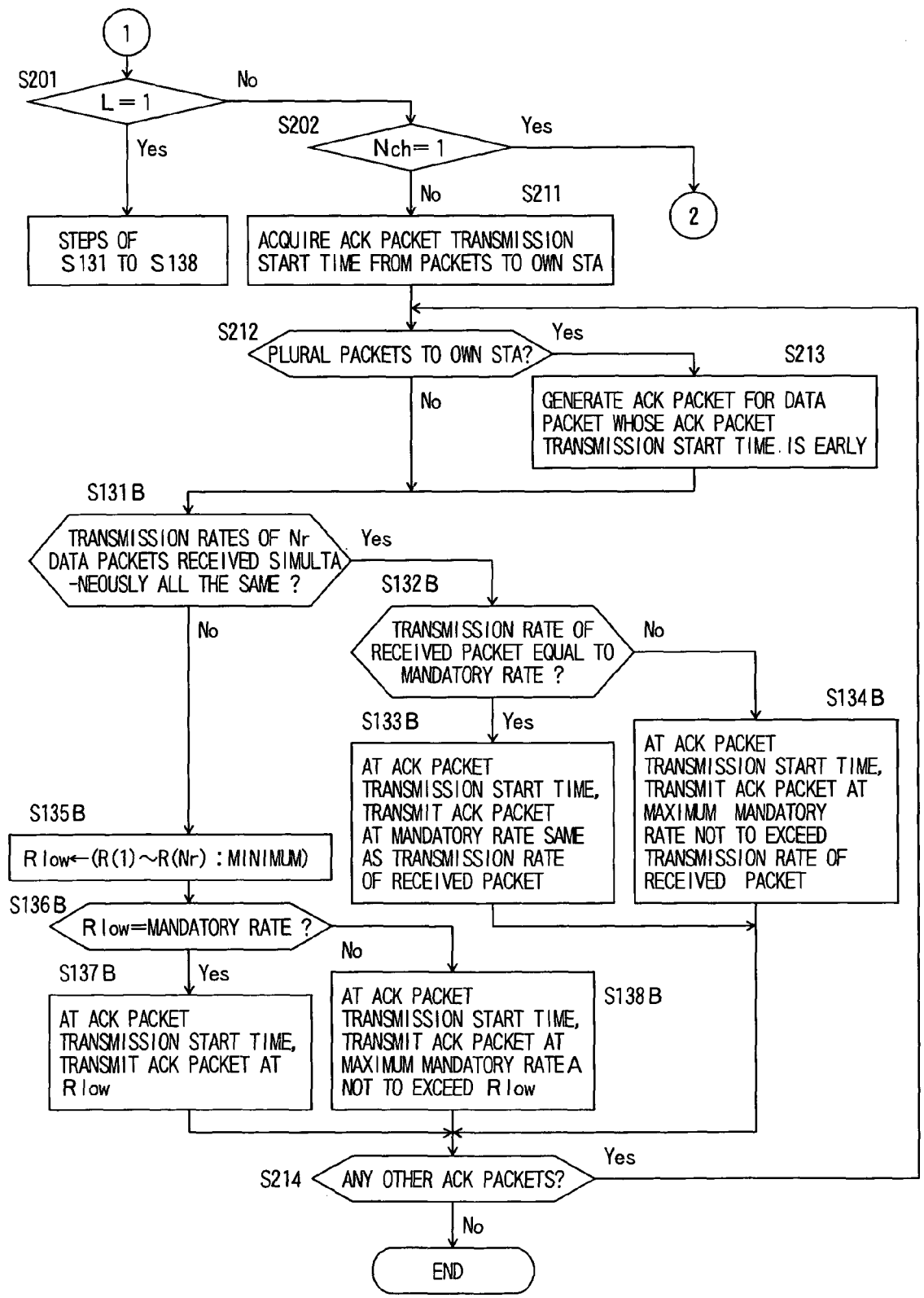
FIG. 13 is a flow chart showing a reception processing procedure (4) in the wireless packet communication method of the invention.
Figure 14:
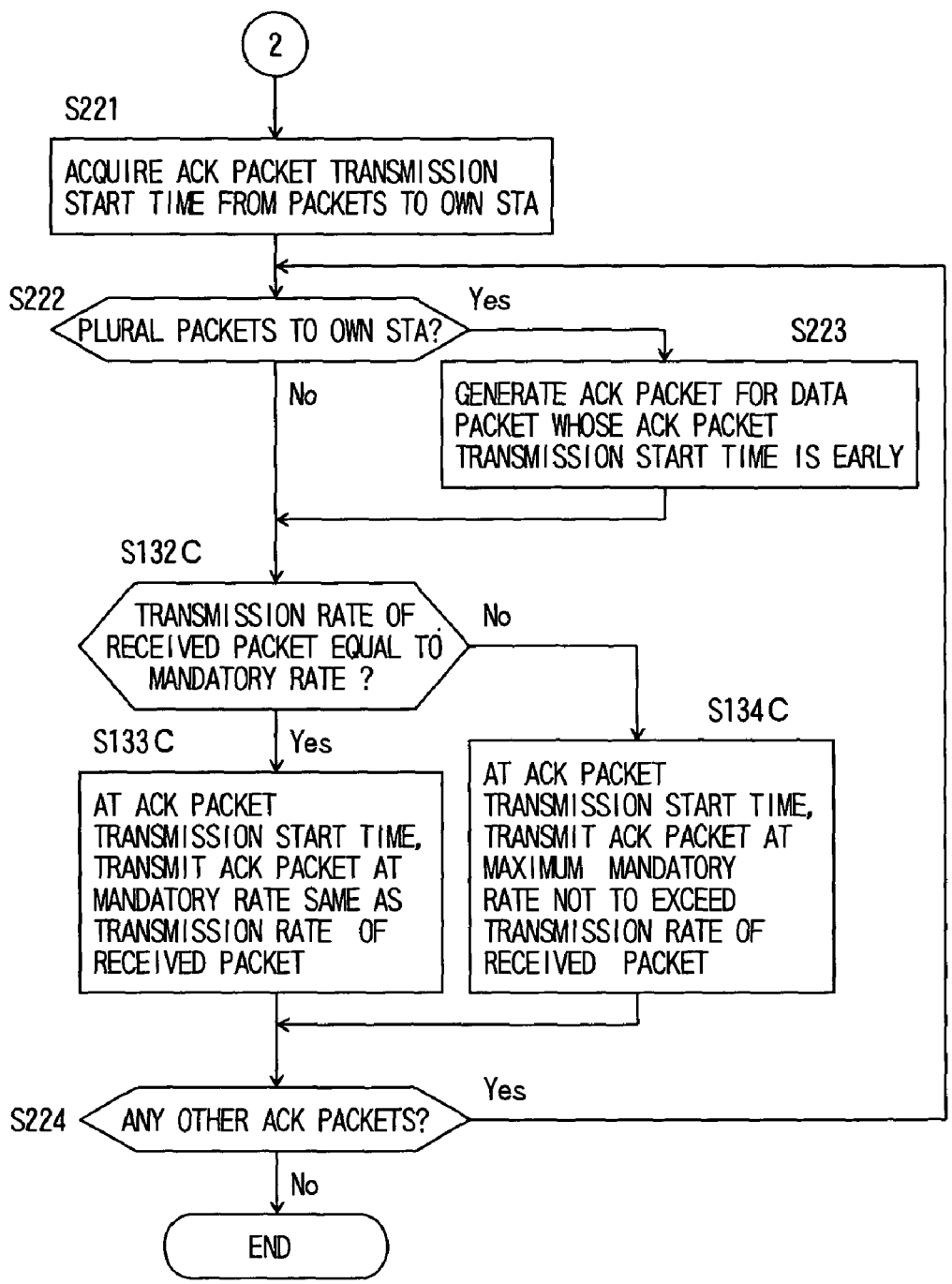
FIG. 14 is a flow chart showing the reception processing procedure (4) in the wireless packet communication method of the invention.

FIGS. 13 and 14 show the reception processing procedure (4) in the wireless packet communication method of the present invention. The reception processing procedure (4) has common in Steps S111 to S121 and Steps S131 to S138 of the reception processing procedure (1) shown in FIGS. 8 and 9. Therefore, the reception processing procedure (Steps S111 to S121) corresponding to FIG. 8 is omitted here and additional part of the reception processing procedure corresponding to FIG. 9 is shown in FIGS. 13 and 14.

When MIMO is applied, the process proceeds to Step S211 or Step S221 of FIG. 14 depending on the number (Nch) of idle channels, through Step S201 to Step S202 of FIG. 13.

Figure 15:
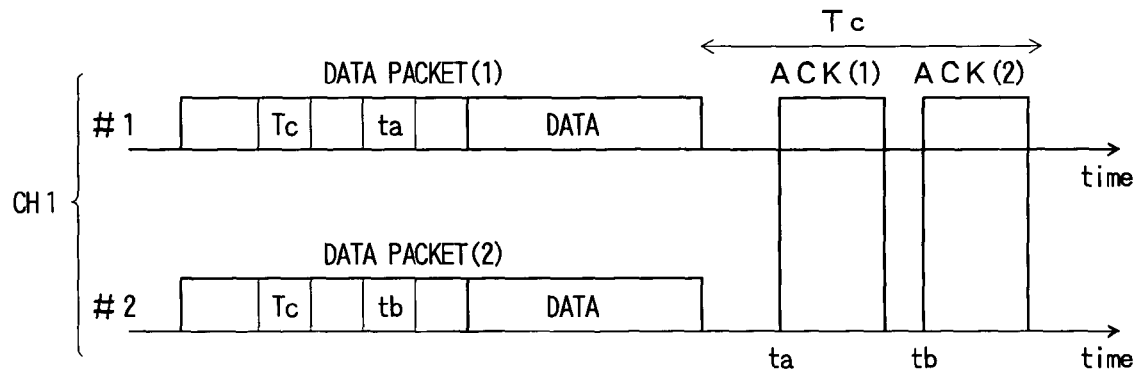
FIG. 15 is a time chart showing an operational example of the reception processing procedure (4).

In Steps S211 and S221, an ACK packet transmission time (ta and tb of FIG. 15) included in the received data packet addressed to the own station is acquired. The information of ACK packet transmission time is used for determining the timing when an ACK packet is transmitted, in Steps S133B, S134B, S137B, and S138B of FIG. 13 and in Steps S133C and S134C of FIG. 14. That is, in Steps S133B, S134B, S137B, S138B, S133C, and S134C, when it is the ACK packet transmission time, the same transmission rate as the transmission rate of the received packet is selected and, by use of the radio channel where the packet addressed to the own station is received, an ACK packet addressed to the transmit-side station is transmitted at the transmission rate.

The respective ACK packet transmission times are determined by the transmit-side station of the data packets. In the example shown in FIG. 15, it is assumed that two data packets (1) and (2) are superposed by MIMO through one radio channel to be transmitted simultaneously. However, the transmission time ta of ACK (1) and the transmission time tb of ACK (2) are scheduled by the transmit-side station so that ACK (1) and ACK (2) do not overlap. The first receive-side station, which is destination with respect to the data packet (1), returns ACK (1) and the second receive-side station, which is destination with respect to the data packet (2), returns ACK (2).

Accordingly, although ACK (1) and ACK (2) are transmitted from different receive-side stations through the same radio channel, the transmission timings are different, so that the transmit-side station can receive all of ACK (1) and ACK (2).

In addition, in order to prohibit the transmissions of STAs other than the destinations of the data packets until all the transmissions of the ACK packets are completed, the value (NAV) representative of the period Tc is included in the data packet.

Figure 16:
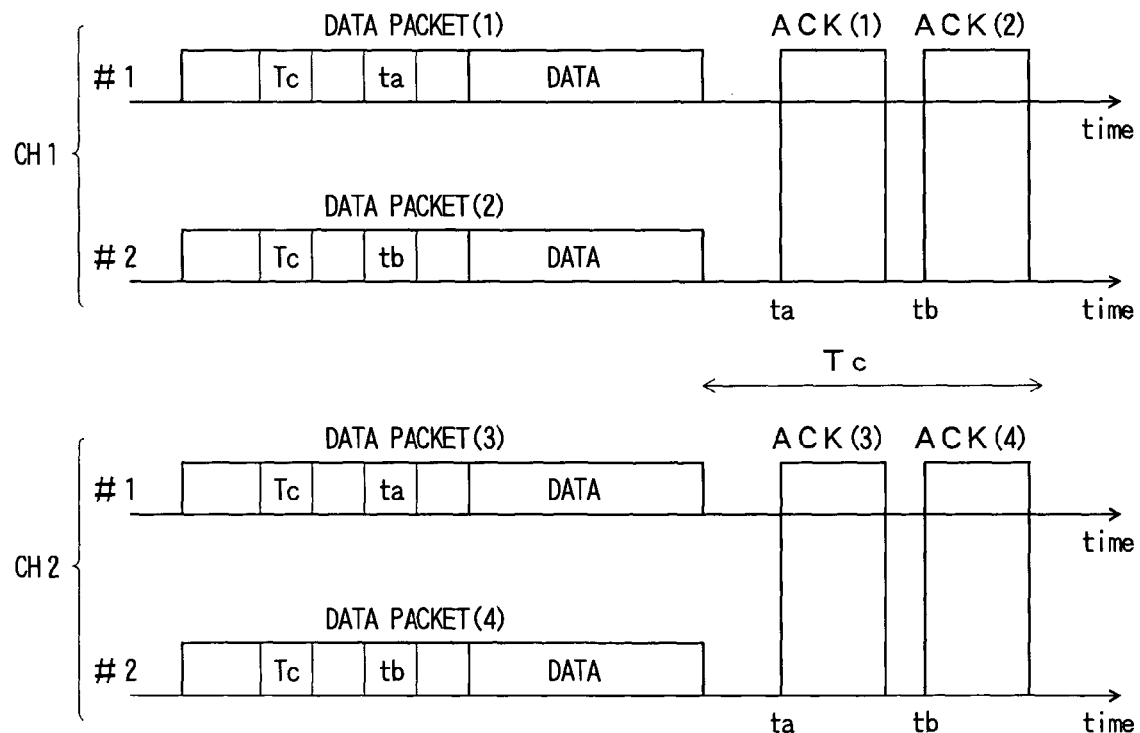
FIG. 16 is a time chart showing an operational example of the reception processing procedure (4).
Figure 17:
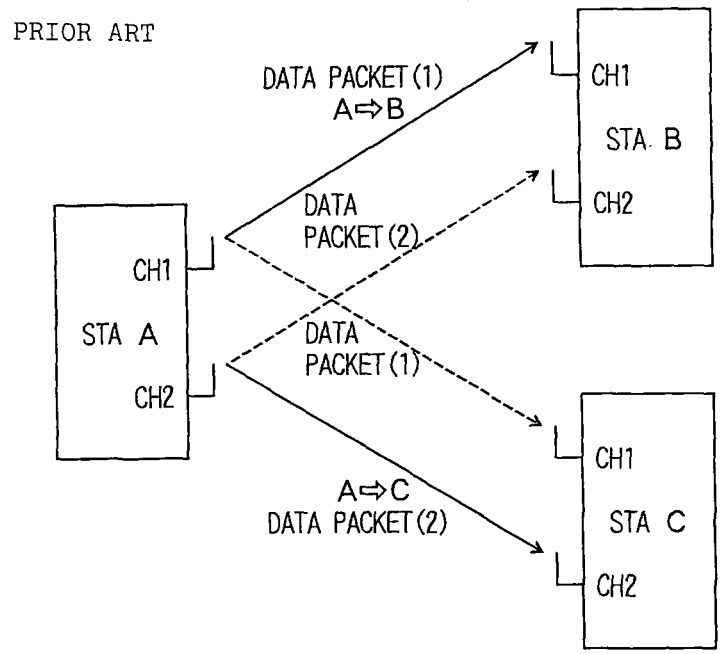
FIG. 17 is a diagram explaining a communication pattern in which a plurality of radio channels are used.
Figure 18:
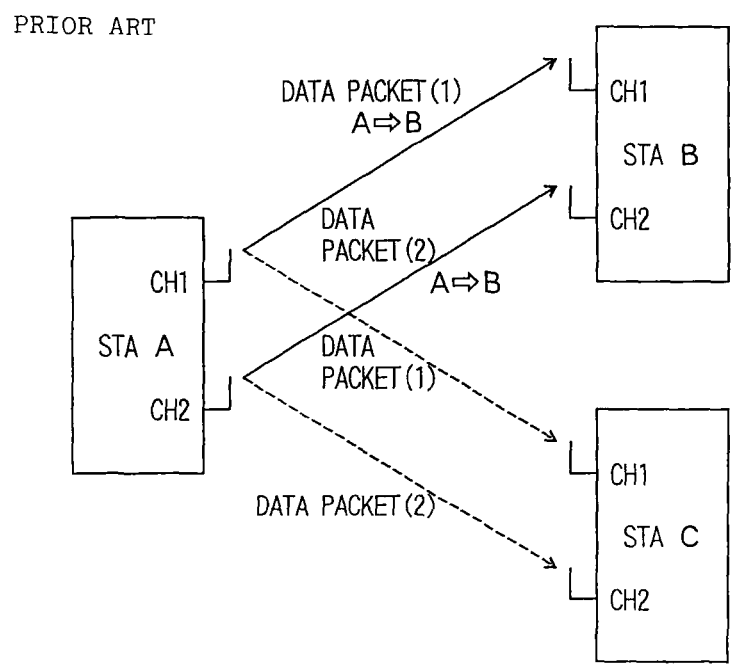
FIG. 18 is a diagram explaining a communication pattern in which a plurality of radio channels are used.
Figure 19:
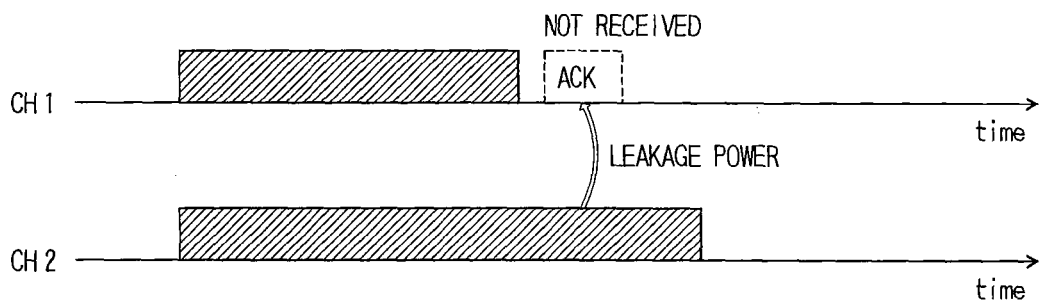
FIG. 19 is a time chart explaining a problem in the case where center frequencies of a plurality of radio channels come close.

Similarly, when, by use of two radio channels CH1 and CH2, two signals whose destinations are different are superposed though the respective radio channels by MIMO, the packet time lengths of ACK packets may be fitted by the method shown in FIG. 10 and scheduling may be performed separately for each radio channel as shown in FIG. 16, so that the signals are transmitted simultaneously through a plurality of radio channels.

The invention is not limited to the above embodiments and various modifications may be made without departing from the spirit and scope of the invention. Any improvement may be made in part or all of the components.

INDUSTRIAL APPLICABILITY

In the present invention, since a transmit-side station can simultaneously transmit a plurality of data packets whose destinations are different, the transmission wait time until a plurality of data packets to be transmitted are provided on a transmission buffer can be shortened and effective throughput can be improved. In addition, even though different transmission rates are used through the respective ones of radio channels, the next data packet is not transmitted until the transmissions of all acknowledgment packets to be returned from receive-side stations are completed. Therefore, all the acknowledgment packets can be received.

The invention claimed is:

1. A wireless packet communication method of transmitting data packets by use of radio channels which are determined to be idle by carrier sense among more than three stations (STAs) in which a plurality of radio channels are available and which includes receiver terminals, characterized by comprising:
    individually managing, for each of the receiver terminals, a plurality of types of available transmission rates to be used for transmission of said data packets;
    when there are a plurality of data packets to be transmitted onto a transmission buffer and when it is possible to transmit said plurality of data packets simultaneously,
    referring to packet sizes representative of data amounts of the respective data packets and to transmission rates of the respective data packets associated with receiver terminals,
    checking packet time lengths of the respective data packets, and
    selecting said plurality of data packets whose packet time lengths are approximately equal to each other regardless of their receiver terminals, the packet times lengths being transmission times defined by the packet sizes and transmission rates; and
    simultaneously commencing the transmissions of said plurality of selected data packets by use of a plurality of radio channels,
    when a first mode and a second mode can be selected,
    comparing transmission efficiency under said first mode to transmission efficiency under said second mode, and
    selecting, according to a result of the comparison, a plurality of data packets whose packet time lengths are approximately equal to each other,
    wherein in the first mode the plurality of data packets whose packet time lengths are equal to each other are generated by dividing a unit of data at a transmission buffer,
    wherein in the second mode the plurality of data packets whose packet time lengths are substantially equal to each other are generated by adding a dummy signal to at least one of the plurality of data packets whose packet time lengths are different from each other.

2. The wireless packet communication method according to claim 1, characterized in that:
    an STA receiving said plurality of data packets including data packets addressed to a designated receiving-side station generates acknowledgment packets to the data packets addressed to the designated receiving-side station and compares receive rates of all data packets received simultaneously to each other; and
    the STA detects a maximum mandatory rate as a lowest receive rate and transmits the acknowledgment packets at the lowest receive rate, the maximum mandatory rate not exceeding a minimum value of the receive rates of all the data packets.

3. The wireless packet communication method according to claim 1, characterized in that:
    an STA receiving said plurality of data packets including data packets addressed to a designated receiving-side station generates acknowledgment packets to the data packets addressed to the designated receiving-side station and compares receive rates of all data packets received simultaneously to each other;
    when said receive rates of all the data packets are not equal to each other, the STA detects as a lowest receive rate a maximum mandatory rate not exceeding a minimum value of all the receive rates, and detects as a local receive rate a maximum mandatory rate not exceeding the receive rate of the data packet addressed to the designated receiving-side station;
    when said local receive rate is higher than said lowest receive rate, the STA adds, to said acknowledgment packets, a dummy bit corresponding to a difference between a first packet time length of an acknowledgment packet to be calculated from said lowest receive rate and a second packet time length of an acknowledgment packet to be calculated from said local receive rate to transmit them at said local receive rate; and
    when said local receive rate and said lowest receive rate are equal to each other, the STA transmits said acknowledgment packets at said lowest receive rate,
    wherein packet time lengths of the acknowledgement packets are substantially equal to each other.

4. The wireless packet communication method according to claim 1, characterized in that:
    an STA receiving said plurality of data packets including data packets addressed to a designated receiving-side station generates acknowledgment packets to the data packets addressed to the designated receiving-side station and compares receive rates of all data packets received simultaneously to each other;
    when said receive rates of all the data packets are not equal to each other, the STA detects as a lowest receive rate a maximum mandatory rate not exceeding a minimum value of all the receive rates, and detects as a local receive rate a maximum mandatory rate not exceeding the receive rate of the data packet addressed to the designated receiving-side station;
    when said local receive rate is higher than said lowest receive rate, the STA sets a transmission deferral duration, NAV, in said acknowledgment packets according to a packet time length of an acknowledgment packet to be calculated from said lowest receive rate and transmits them at said local receive rate; and
    when said local receive rate and said lowest receive rate are equal to each other, the STA transmits said acknowledgment packets at said lowest receive rate.

5. A wireless packet communication method of transmitting a plurality of data packets by MIMO via a plurality of radio channels which are determined to be idle by carrier sense among more than three stations (STAs) including receiver terminals which can perform the MIMO on a plurality of signals for one radio channel comprising:
    individually managing, for each of the receiver terminals, a plurality of types of available transmission rates to be used for transmission of said plurality of data packets;
    determining a packet size of each of the plurality of data packets and determining a transmission rate of each of the plurality of data packets to be transmitted to an associated terminal of the receiver terminals, wherein the packet size indicates data amount of the data packet, determining a packet time length of each of the plurality of data packets, wherein the packet time length is transmission time defined by the packet size and the transmission rate of the data packet, and selecting, from said plurality of data packets, data packets whose packet time lengths are approximately equal to each other regardless of the associated receiver terminals of the selected data packets;

determining when the receiver terminals of the data packets transmit acknowledgment packets from the packet time lengths of said data packets and the packet time lengths of acknowledgment packets, wherein the packet time lengths of the acknowledgment packets are calculated from the transmission rates of the data packets associated with destinations, and storing, in each of the selected data packets, information of acknowledgment packet transmission time and information of a transmission deferral duration, NAV, wherein the NAV is a period of time taken for completion of transmissions of acknowledgment packets to all of data packets simultaneously transmitted, wherein the acknowledgment packet transmission time indicates when the receiver terminals of the selected data packets are allowed to transmit the acknowledgment packets; and each acknowledgment packet transmission time simultaneously commencing the transmissions of said selected data packets by the MIMO, when a first mode and a second mode can be selected,
comparing transmission efficiency under said first mode to transmission efficiency under said second mode, and selecting, according to a result of the comparison, a plurality of data packets whose packet time lengths are approximately equal to each other, wherein in the first mode the plurality of data packets whose packet time lengths are equal to each other are generated by dividing a unit of data at a transmission buffer, wherein in the second mode the plurality of data packets whose packet time lengths are substantially equal to each other are generated by adding a dummy signal to at least one of the plurality of data packets whose packet time lengths are different from each other.

6. The wireless packet communication method according to claim 1 or 5, characterized by further comprising
switching over to transmissions at lower transmission rates when said plurality of data packets whose packet time lengths are approximately equal to each other are selected in association with transmission rates lower than a current transmission rate.

7. The wireless packet communication method according to claim 5, characterized in that:
an STA receiving said plurality of data packets including data packets addressed to a designated receiving-side station generates acknowledgment packets to the data packets addressed to the designated receiving-side station and detects acknowledgment-packet transmission times which are held in the data packets addressed to the designated receiving-side station; and
the STA transmits said acknowledgment packets at the timing of the acknowledgment-packet transmission times at the maximum mandatory rate that does not exceed the receive rate of the data packet addressed to the designated receiving-side station.

8. The wireless packet communication method according to claim 5, characterized by further comprising
detecting a number, Nch, of idle radio channels and a number, Np, of said data packets whose packet time lengths are approximately equal to each other, and simultaneously transmitting Np data packets by use of Np idle channels without using the MIMO when Nch is more than Np, Nch≧Np, and simultaneously transmitting a plurality of data packets using the MIMO when Nch is less than Np, Nch<Np.

9. A wireless packet communication apparatus that transmits data packets by use of radio channels which are determined to be idle by carrier sense, between more than three stations (STAs) in which a plurality of radio channels are available, the wireless packet communication apparatus characterized by comprising:
a unit that individually manages, for each receiver terminal, a plurality of types of available transmission rates to be used for transmissions of said data packets;
when there are a plurality of data packets to be transmitted onto a transmission buffer and when it is possible to transmit said plurality of data packets simultaneously, a unit that refers to packet sizes representative of data amounts of the respective data packets and to transmission rates of the respective data packets associated with receiver terminals, that checks packet time lengths of the respective data packets, and that selects said plurality of data packets whose packet time lengths are approximately equal to each other regardless of their receiver terminals, the packet time lengths being transmission times defined by said packet sizes and transmission rates; and
a unit that commences the transmissions of said plurality of selected data packets simultaneously by use of a plurality of radio channels,
a unit that sets a first mode and a second mode, the first mode in which a plurality of data packets whose packet time lengths are equal to each other are generated by dividing a unit of data on a transmission buffer, the second mode in which a plurality of data packets whose packet time lengths are substantially equal to each other are generated by adding a dummy signal to at least one of said plurality of data packets whose packet time lengths are different from each other; and
a unit that compares transmission efficiency under said first mode to transmission efficiency under said second mode and selects, according to a result of the comparison, one of the modes to generate said plurality of data packets whose packet time lengths are approximately equal to each other.

10. The wireless packet communication apparatus according to claim 9, characterized in that a STA receiving said plurality of data packets including data packets addressed to a designated receiving-side station includes:
a unit that generates acknowledgment packets for the data packets addressed to the designated receiving-side station and compares the receive rates of all the data packets received simultaneously; and
a unit that detects a maximum mandatory rate as a lowest receive rate and transmits said acknowledgment packets at said lowest receive rate, the maximum mandatory rate not exceeding a minimum value of said receive rates of all the data packets.

11. The wireless packet communication apparatus according to claim 9, characterized in that a STA receiving said plurality of data packets including data packets addressed to a designated receiving-side station includes:

a unit that generates acknowledgment packets for the data packets addressed to the designated receiving-side station and compares the receive rates of all the data packets received simultaneously to each other; and a unit that detects as a lowest receive rate a maximum mandatory rate not exceeding a minimum value of all the receive rates and detects as a local receive rate a maximum mandatory rate not exceeding the receive rate of the data packet addressed to the designated receiving-side station, when said receive rates of all the data packets are not equal to each other;

a unit that add a dummy bit to said acknowledgment packets to transmit them at said local receive rate when said local receive rate is higher than said lowest receive rate, the dummy bit corresponding to a difference between a first packet time length of an acknowledgment packet to be calculated from said lowest receive rate and a second packet time length of an acknowledgment packet to be calculated from said local receive rate; and a unit that transmits said acknowledgment packets at said lowest receive rate when said local receive rate and said lowest receive rate are equal to each other.

12. The wireless packet communication apparatus according to claim 9, characterized in that a STA receiving said plurality of data packets including data packets addressed to the designated receiving-side station includes:

a unit that generates acknowledgment packets for the data packets addressed to the designated receiving-side station and compares the transmission rates of all the data packets received simultaneously to each other;

a unit that detects as the lowest receive rate the maximum mandatory rate not exceeding the minimum value of all the receive rates and detects as a local receive rate the maximum mandatory rate not exceeding the receive rate of the data packet addressed to the designated receiving-side station, when said receive rates of all the data packets are not equal to each other;

a unit that sets a transmission deferral duration, NAV, in said acknowledgment packets according to a packet time length of an acknowledgment packet to be calculated from said lowest receive rate and that transmits them at said local receive rate, when said local receive rate is higher than said lowest receive rate; and a unit that transmits said acknowledgment packets at said lowest receive rate when said local receive rate and said lowest receive rate are equal to each other.

13. A wireless packet communication apparatus that transmits data packets by MIMO by use of radio channels which are determined to be idle by carrier sense, between more than three stations (STAs) which can perform the MIMO on a plurality of signals for one radio channel, the wireless packet communication apparatus characterized by comprising:

a unit that individually manages, for each receiver terminal, a plurality of types of available transmission rates to be used for transmission of said data packets;

when there are a plurality of data packets to be transmitted onto a transmission buffer and when it is possible to transmit said plurality of data packets simultaneously, a unit that refers to packet sizes representative of data amounts of the respective data packets and to transmission rates of the respective data packets associated with receiver terminals, that checks packet time lengths of the respective data packets, and that selects said plurality of data packets whose packet time lengths are approximately equal to each other regardless of their receiver terminals, the packet time lengths being transmission times defined by said packet sizes and transmission rates;

a unit that determines, from the packet time lengths of said data packets and of acknowledgment packets to be calculated from the transmission rates of the data packets associated with destinations, time when the receiver terminals of the data packets transmit acknowledgment packets and stores, in the respective data packets, information on acknowledgment packet transmission time and information on a transmission deferral duration, NAV, which is a period of time taken for completion of the transmissions of acknowledgment packets to all of data packets transmitted simultaneously, the acknowledgment packet transmission time being time when the receiver terminals of the respective data packets are allowed to transmit acknowledgment packets; and a unit that simultaneously commences the transmissions of said plurality of selected data packets by the MIMO, a unit that sets a first mode and a second mode, the first mode in which a plurality of data packets whose packet time lengths are equal to each other are generated by dividing a unit of data on a transmission buffer, the second mode in which a plurality of data packets whose packet time lengths are substantially equal to each other are generated by adding a dummy signal to at least one of said plurality of data packets whose packet time lengths are different from each other; and a unit that compares transmission efficiency under said first mode to transmission efficiency under said second mode and selects, according to a result of the comparison, one of the modes to generate said plurality of data packets whose packet time lengths are approximately equal to each other.

14. The wireless packet communication apparatus according to claim 9 or 13, characterized by further comprising a unit switching over to transmissions at lower transmission rates when a plurality of data packets whose packet time lengths are approximately equal to each other are selected in association with transmission rates lower than current transmission rates.

15. The wireless packet communication apparatus according to claim 13, characterized in that a STA receiving said plurality of data packets including data packets addressed to a designated receiving-side station includes:

a unit that generates acknowledgment packets for the data packets addressed to the designated receiving-side station and detects acknowledgment-packet transmission times which are held in the data packets addressed to the designated receiving-side station; and a unit that transmits said acknowledgment packets at the timing of the acknowledgment-packet transmission times at the maximum mandatory rate that does not exceed the receive rate of the data packet addressed to the designated receiving-side station.

16. The wireless packet communication apparatus according to claim 13, by characterized by further comprising a unit that detects a number, Nch, of idle radio channels and a number, Np, of data packets whose packet time lengths are approximately equal to each other and transmits Np data packets simultaneously by use of Np idle radio channels without using the MIMO when Nch is more than Np, Nch$\geq$Np, and that transmits a plurality of data packets simultaneously by use of the MIMO when Nch is less than Np, Nch<Np.

17. A wireless packet communication method of transmitting a plurality of data packets by MIMO via a plurality of radio channels which are determined to be idle by carrier sense among more than three stations (STAs) including receiver terminals which can perform the MIMO on a plurality of signals for one radio channel comprising:
- individually managing, for each of the receiver terminals, a plurality of types of available transmission rates to be used for transmission of said plurality of data packets;
- determining a packet size of each of the plurality of data packets and determining a transmission rate of each of the plurality of data packets to be transmitted to an associated terminal of the receiver terminals, wherein the packet size indicates data amount of the data packet,
- determining a packet time length of each of the plurality of data packets, wherein the packet time length is transmission time defined by the packet size and the transmission rate of the data packet, and
- selecting, from said plurality of data packets, data packets whose packet time lengths are approximately equal to each other regardless of the associated receiver terminals of the selected data packets;
- determining when the receiver terminals of the data packets transmit acknowledgment packets from the packet time lengths of said data packets and the packet time lengths of acknowledgment packets, wherein the packet time lengths of the acknowledgment packets are calculated from the transmission rates of the data packets associated with destinations, and
- storing, in each of the selected data packets, information of acknowledgment packet transmission time and information of a transmission deferral duration, NAV, wherein the NAV is a period of time taken for completion of transmissions of acknowledgment packets to all of data packets simultaneously transmitted, wherein the acknowledgment packet transmission time indicates when the receiver terminals of the selected data packets are allowed to transmit the acknowledgment packets; and
- each acknowledgment packet transmission time simultaneously commencing the transmissions of said selected data packets by the MIMO,
  - detecting a number, Nch, of idle radio channels and a number, Np, of said data packets whose packet time lengths are approximately equal to each other, and simultaneously transmitting Np data packets by use of Np idle channels without using the MIMO when Nch is more than Np, Nch≧Np, and simultaneously transmitting a plurality of data packets using the MIMO when Nch is less than Np, Nch<Np.

18. The wireless packet communication method according to claim 17, characterized by further comprising
- switching over to transmissions at lower transmission rates when said plurality of data packets whose packet time lengths are approximately equal to each other are selected in association with transmission rates lower than a current transmission rate.

19. The wireless packet communication method according to claim 17, characterized in that:
- an STA receiving said plurality of data packets including data packets addressed to a designated receiving-side station generates acknowledgment packets to the data packets addressed to the designated receiving-side station and detects acknowledgment-packet transmission times which are held in the data packets addressed to the designated receiving-side station; and
- the STA transmits said acknowledgment packets at the timing of the acknowledgment-packet transmission times at the maximum mandatory rate that does not exceed the receive rate of the data packet addressed to the designated receiving-side station.

20. A wireless packet communication apparatus that transmits data packets by MIMO by use of radio channels which are determined to be idle by carrier sense, between more than three stations (STAs) which can perform the MIMO on a plurality of signals for one radio channel, the wireless packet communication apparatus characterized by comprising:
- a unit that individually manages, for each receiver terminal, a plurality of types of available transmission rates to be used for transmission of said data packets;
- when there are a plurality of data packets to be transmitted onto a transmission buffer and when it is possible to transmit said plurality of data packets simultaneously, a unit that refers to packet sizes representative of data amounts of the respective data packets and to transmission rates of the respective data packets associated with receiver terminals, that checks packet time lengths of the respective data packets, and that selects said plurality of data packets whose packet time lengths are approximately equal to each other regardless of their receiver terminals, the packet time lengths being transmission times defined by said packet sizes and transmission rates;
- a unit that determines, from the packet time lengths of said data packets and of acknowledgment packets to be calculated from the transmission rates of the data packets associated with destinations, time when the receiver terminals of the data packets transmit acknowledgment packets and stores, in the respective data packets, information on acknowledgment packet transmission time and information on a transmission deferral duration, NAV, which is a period of time taken for completion of the transmissions of acknowledgment packets to all of data packets transmitted simultaneously, the acknowledgment packet transmission time being time when the receiver terminals of the respective data packets are allowed to transmit acknowledgment packets; and
- a unit that simultaneously commences the transmissions of said plurality of selected data packets by the MIMO, characterized by further comprising
  - a unit that detects a number, Nch, of idle radio channels and a number, Np, of data packets whose packet time lengths are approximately equal to each other and transmits Np data packets simultaneously by use of Np idle radio channels without using the MIMO when Nch is more than Np, Nch≧Np, and that transmits a plurality of data packets simultaneously by use of the MIMO when Nch is less than Np, Nch<Np.

21. The wireless packet communication apparatus according to claim 20, characterized by further comprising
- a unit switching over to transmissions at lower transmission rates when a plurality of data packets whose packet time lengths are approximately equal to each other are selected in association with transmission rates lower than current transmission rates.

22. The wireless packet communication apparatus according to claim 20, characterized in that a STA receiving said plurality of data packets including data packets addressed to a designated receiving-side station includes:
- a unit that generates acknowledgment packets for the data packets addressed to the designated receiving-side station and detects acknowledgment-packet transmission times which are held in the data packets addressed to the designated receiving-side station; and
- a unit that transmits said acknowledgment packets at the timing of the acknowledgment-packet transmission times at the maximum mandatory rate that does not exceed the receive rate of the data packet addressed to the designated receiving-side station.

23. A wireless packet communication method of transmitting a plurality of data packets by MIMO via a plurality of radio channels which are determined to be idle by carrier sense among more than three stations (STAs) including receiver terminals which can perform the MIMO on a plurality of signals for one radio channel comprising:

individually managing, for each of the receiver terminals, a plurality of types of available transmission rates to be used for transmission of said plurality of data packets;

determining a packet size of each of the plurality of data packets and determining a transmission rate of each of the plurality of data packets to be transmitted to an associated terminal of the receiver terminals, wherein the packet size indicates data amount of the data packet, determining a packet time length of each of the plurality of data packets, wherein the packet time length is transmission time defined by the packet size and the transmission rate of the data packet, and selecting, from said plurality of data packets, data packets whose packet time lengths are approximately equal to each other regardless of the associated receiver terminals of the selected data packets;

determining when the receiver terminals of the data packets transmit acknowledgment packets from the packet time lengths of said data packets and the packet time lengths of acknowledgment packets, wherein the packet time lengths of the acknowledgment packets are calculated from the transmission rates of the data packets associated with destinations, and storing, in each of the selected data packets, information of acknowledgment packet transmission time and information of a transmission deferral duration, NAV, wherein the NAV is a period of time taken for completion of transmissions of acknowledgment packets to all of data packets simultaneously transmitted, wherein the acknowledgment packet transmission time indicates when the receiver terminals of the selected data packets are allowed to transmit the acknowledgment packets; and each acknowledgment packet transmission time simultaneously commencing the transmissions of said selected data packets by the MIMO, characterized by further comprising switching over to transmissions at lower transmission rates when said plurality of data packets whose packet time lengths are approximately equal to each other are selected in association with transmission rates lower than a current transmission rate.

24. A wireless packet communication apparatus that transmits data packets by MIMO by use of radio channels which are determined to be idle by carrier sense, between more than three stations (STAs) which can perform the MIMO on a plurality of signals for one radio channel, the wireless packet communication apparatus characterized by comprising:

a unit that individually manages, for each receiver terminal, a plurality of types of available transmission rates to be used for transmission of said data packets;

when there are a plurality of data packets to be transmitted onto a transmission buffer and when it is possible to transmit said plurality of data packets simultaneously, a unit that refers to packet sizes representative of data amounts of the respective data packets and to transmission rates of the respective data packets associated with receiver terminals, that checks packet time lengths of the respective data packets, and that selects said plurality of data packets whose packet time lengths are approximately equal to each other regardless of their receiver terminals, the packet time lengths being transmission times defined by said packet sizes and transmission rates;

a unit that determines, from the packet time lengths of said data packets and of acknowledgment packets to be calculated from the transmission rates of the data packets associated with destinations, time when the receiver terminals of the data packets transmit acknowledgment packets and stores, in the respective data packets, information on acknowledgment packet transmission time and information on a transmission deferral duration, NAV, which is a period of time taken for completion of the transmissions of acknowledgment packets to all of data packets transmitted simultaneously, the acknowledgment packet transmission time being time when the receiver terminals of the respective data packets are allowed to transmit acknowledgment packets; and a unit that simultaneously commences the transmissions of said plurality of selected data packets by the MIMO, characterized by further comprising a unit switching over to transmissions at lower transmission rates when a plurality of data packets whose packet time lengths are approximately equal to each other are selected in association with transmission rates lower than current transmission rates.

* * * * *